United States Patent
Mathews et al.

(10) Patent No.: US 11,334,523 B2
(45) Date of Patent: May 17, 2022

(54) FINDING STORAGE OBJECTS OF A SNAPSHOT GROUP POINTING TO A LOGICAL PAGE IN A LOGICAL ADDRESS SPACE OF A STORAGE SYSTEM

(71) Applicant: EMC IP Holding Company LLC, Hopkinton, MA (US)

(72) Inventors: Alexander S. Mathews, Morganville, NJ (US); Dixitkumar Vishnubhai Patel, Monroe, NJ (US)

(73) Assignee: EMC IP Holding Company LLC, Hopkinton, MA (US)

( * ) Notice: Subject to any disclaimer, the term of this patent is extended or adjusted under 35 U.S.C. 154(b) by 102 days.

(21) Appl. No.: 16/862,733

(22) Filed: Apr. 30, 2020

(65) Prior Publication Data

US 2021/0342298 A1 Nov. 4, 2021

(51) Int. Cl.
*G06F 16/11* (2019.01)
*G06F 16/24* (2019.01)
*G06F 16/22* (2019.01)
*G06F 16/188* (2019.01)

(52) U.S. Cl.
CPC .......... *G06F 16/128* (2019.01); *G06F 16/188* (2019.01); *G06F 16/2246* (2019.01); *G06F 16/2255* (2019.01); *G06F 16/24* (2019.01)

(58) Field of Classification Search
CPC .. G06F 16/128; G06F 16/188; G06F 16/2246; G06F 26/2255; G06F 16/24; G06F 16/2255
See application file for complete search history.

(56) References Cited

U.S. PATENT DOCUMENTS

| 8,423,733 B1* | 4/2013 | Ozdemir ............... G06F 3/065 711/162 |
| 8,954,383 B1 | 2/2015 | Vempati et al. |
| 9,003,227 B1 | 4/2015 | Patel et al. |
| 9,104,675 B1 | 8/2015 | Clark et al. |
| 9,778,996 B1 | 10/2017 | Bono et al. |

(Continued)

OTHER PUBLICATIONS

U.S. Appl. No. 16/260,660, filed Jan. 29, 2019, and entitled "System and Method for Aggregating Metadata Changes in a Storage System."

*Primary Examiner* — Alicia M Willoughby
(74) *Attorney, Agent, or Firm* — Ryan, Mason & Lewis, LLP

(57) ABSTRACT

An apparatus comprises a processing device configured to generate a tree structure characterizing relationships between storage objects in a storage system represented as logical page nodes specifying respective logical page addresses, arrays of pointers to other logical page addresses, snapshot group identifiers, and logical extent offsets. The processing device is also configured to traverse the generated tree structure to identify (i) a given logical page node specifying a given logical page address, snapshot group identifier and logical extent offset from a query and (ii) other ones of the logical page nodes that specify the given snapshot group identifier and logical extent offset and comprise a pointer to the given logical page address in its associated array of pointers. The processing device is further configured to provide a response to the query specifying the given logical page node and the identified other ones of the logical page nodes.

20 Claims, 17 Drawing Sheets

(56) References Cited

U.S. PATENT DOCUMENTS

| | | | |
|---|---|---|---|
| 2014/0244935 A1* | 8/2014 | Ezra | G06F 3/065 |
| | | | 711/133 |
| 2014/0310499 A1* | 10/2014 | Sundararaman | G06F 16/2308 |
| | | | 711/203 |
| 2015/0127618 A1* | 5/2015 | Alberti | G06F 8/63 |
| | | | 707/678 |
| 2016/0070652 A1* | 3/2016 | Sundararaman | G06F 3/065 |
| | | | 711/154 |
| 2017/0052717 A1* | 2/2017 | Rawat | G06F 16/128 |
| 2020/0019620 A1* | 1/2020 | Sarda | G06F 16/113 |
| 2020/0034308 A1* | 1/2020 | Shveidel | G06F 3/067 |
| 2020/0065399 A1* | 2/2020 | Desai | G06F 16/2246 |
| 2020/0065408 A1* | 2/2020 | Desai | G06F 16/2246 |
| 2020/0226035 A1* | 7/2020 | Li | G06F 16/2365 |
| 2020/0311025 A1* | 10/2020 | Singh | G06F 21/645 |

* cited by examiner

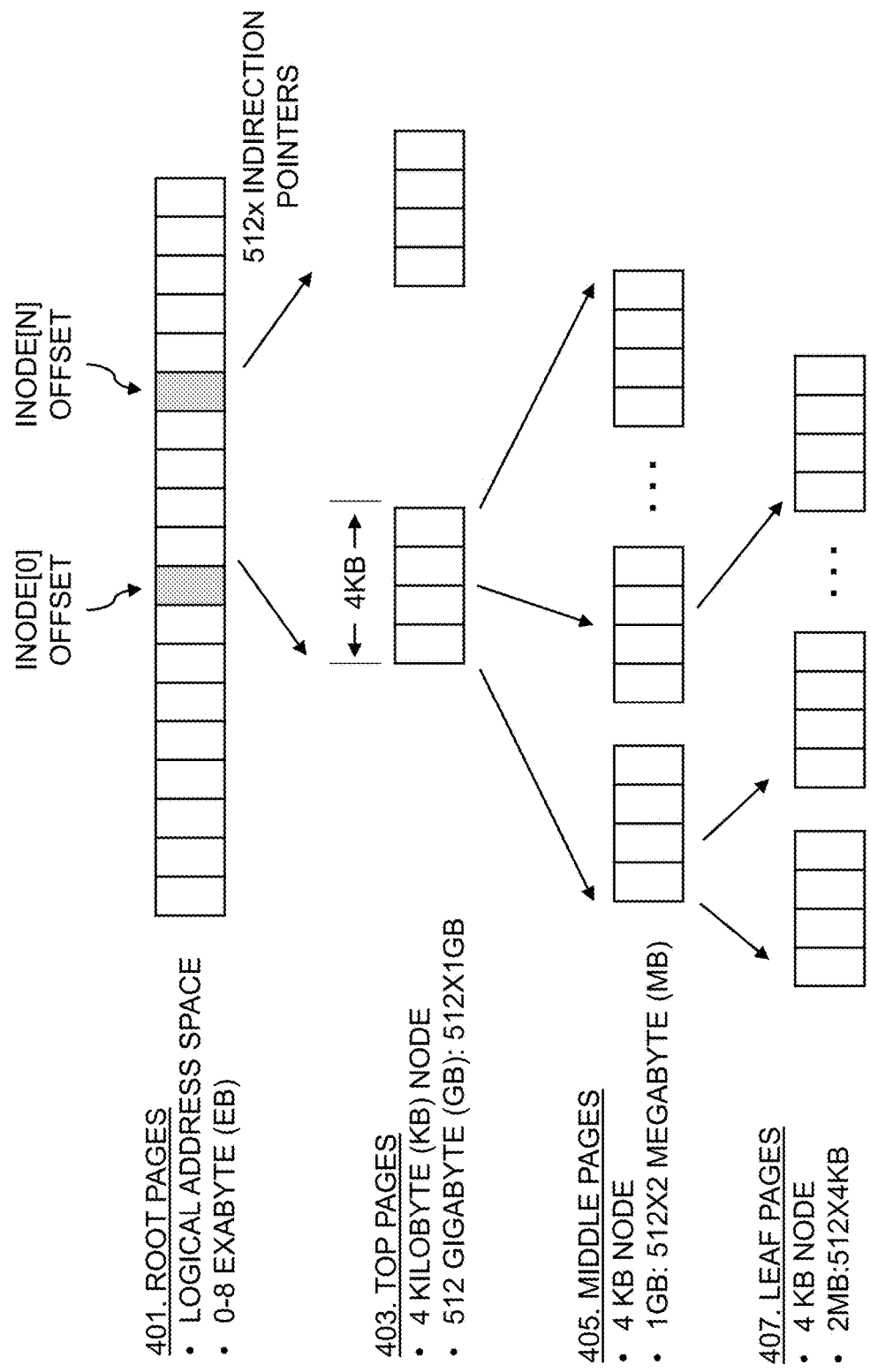

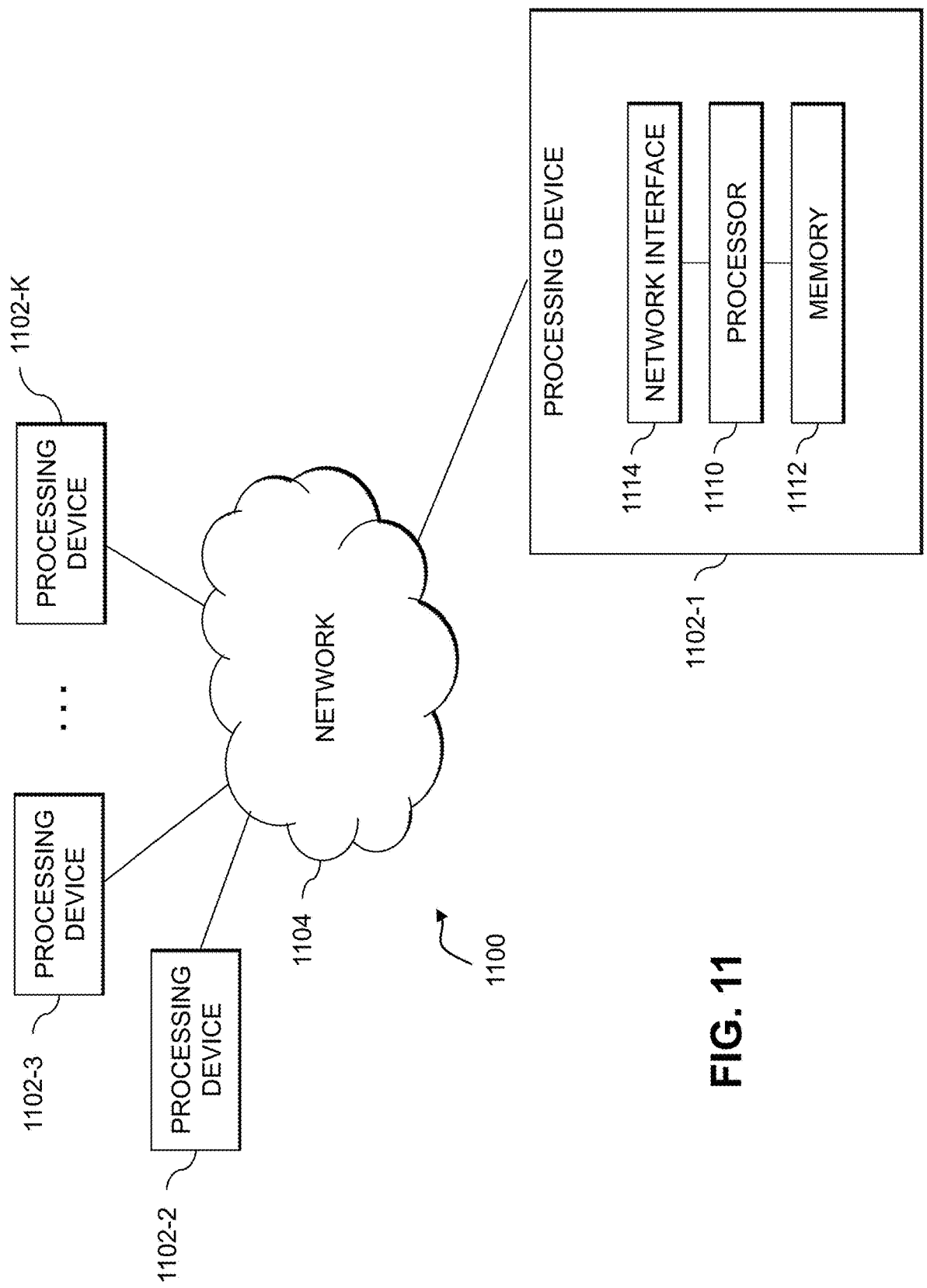

FINDING STORAGE OBJECTS OF A SNAPSHOT GROUP POINTING TO A LOGICAL PAGE IN A LOGICAL ADDRESS SPACE OF A STORAGE SYSTEM

FIELD

The field relates generally to information processing, and more particularly to storage in information processing systems.

BACKGROUND

Storage arrays and other types of storage systems are often shared by multiple host devices over a network. Applications running on the host devices each include one or more processes that perform the application functionality. Such processes issue input-output (IO) operation requests for delivery to the storage systems. Storage controllers of the storage systems service such requests for TO operations. Some storage systems use a logical address space, where logical page addresses in the logical address space map to physical page addresses on storage devices of the storage systems. The use of a logical address space facilitates various functionality, including implementation of deduplication in order to ensure that the same data is not repeatedly stored in a duplicative manner that consumes excessive storage capacity.

SUMMARY

Illustrative embodiments of the present disclosure provide techniques for finding storage objects of a snapshot group that point to a particular logical page in a logical address space of a storage system.

In one embodiment, an apparatus comprises at least one processing device comprising a processor coupled to a memory. The at least one processing device is configured to perform the step of generating a tree structure characterizing relationships between a plurality of storage objects in a storage system, the tree structure comprising a plurality of logical page nodes representing the plurality of storage objects, the plurality of logical page nodes specifying respective logical page addresses in a logical address space of the storage system, arrays of pointers to one or more other logical page addresses in the logical address space, snapshot group identifiers for snapshot groups in the storage system, and logical extent offsets in the logical address space. The at least one processing device is also configured to perform the step of receiving a query comprising a given logical page address, a given snapshot group identifier for a given one of the snapshot groups, and a given logical extent offset. The at least one processing device is further configured to perform the step of traversing the generated tree structure to identify: (i) whether the generated tree structure comprises a given logical page node specifying the given logical page address, the given snapshot group identifier, and the given logical extent offset; and (ii) one or more other ones of the plurality logical page nodes that specify the given snapshot group identifier and the given logical extent offset and comprise a pointer to the given logical page address in its associated array of pointers. The at least one processing device is further configured to perform the step of providing a response to the query specifying the given logical page node and the identified other ones of the plurality of logical page nodes.

These and other illustrative embodiments include, without limitation, methods, apparatus, networks, systems and processor-readable storage media.

BRIEF DESCRIPTION OF THE DRAWINGS

FIGS. 4A and 4B illustrate a tree structure for a logical address space in an illustrative embodiment.

FIGS. 10 and 11 show examples of processing platforms that may be utilized to implement at least a portion of an information processing system in illustrative embodiments.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
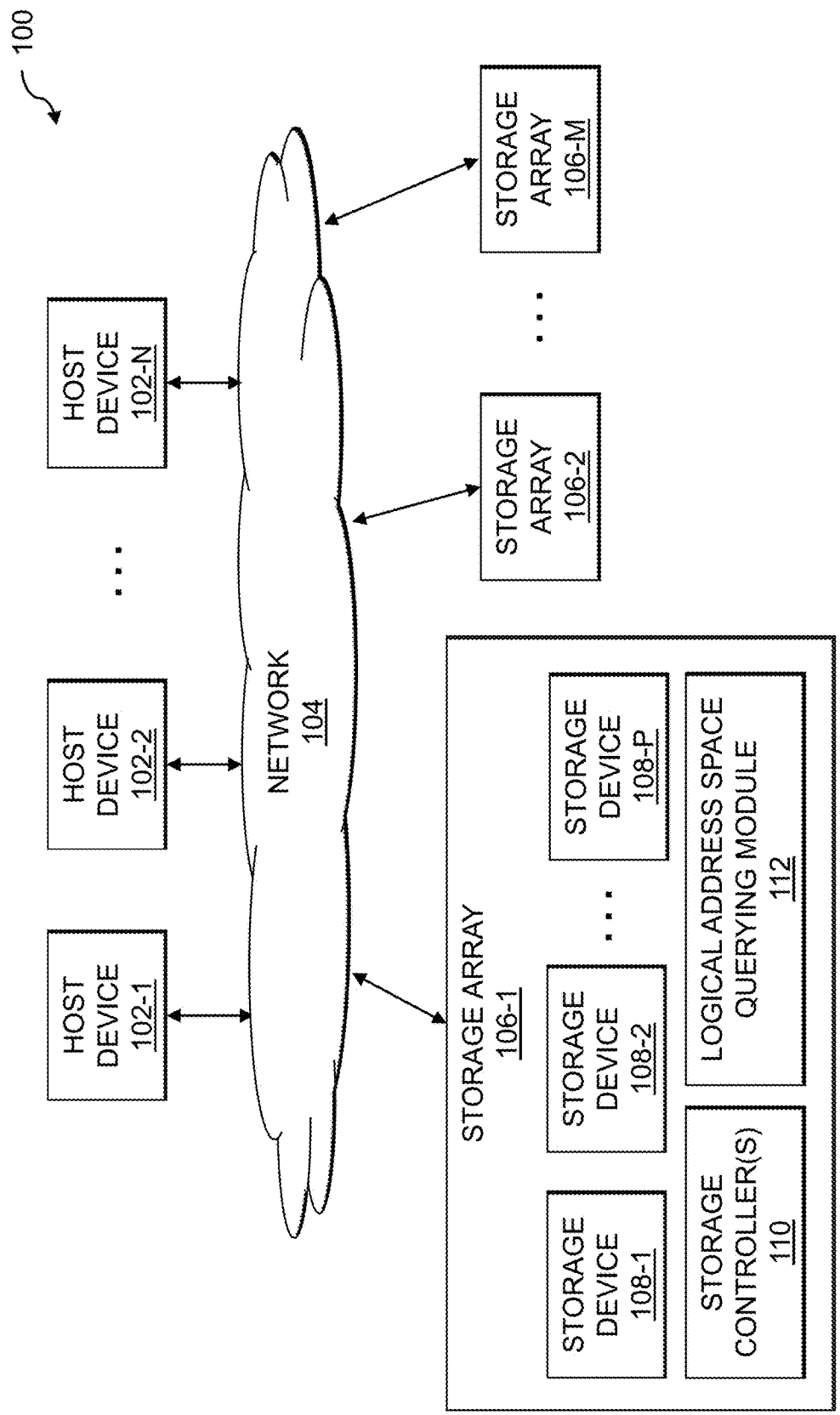
FIG. 1 is a block diagram of an information processing system including a storage array configured for finding storage objects of a snapshot group that point to a particular logical page in a logical address space of the storage array in an illustrative embodiment.

FIG. 1 shows an information processing system 100 configured in accordance with an illustrative embodiment. The information processing system 100 comprises one or more host devices 102-1, 102-2, . . . 102-N (collectively, host devices 102) that communicate over a network 104 with one or more storage arrays 106-1, 106-2, . . . 106-M (collectively, storage arrays 106). The network 104 may comprise a storage area network (SAN).

The storage array 106-1, as shown in FIG. 1, comprises a plurality of storage devices 108-1, 108-2, . . . 108-P (collectively, storage devices 108) each storing data utilized by one or more applications running on the host devices 102. The storage devices 108 are illustratively arranged in one or more storage pools. The storage array 106-1 also comprises one or more storage controllers 110 that facilitate IO processing for the storage devices 108. The storage array 106-1 and its associated storage devices 108 are an example of what is more generally referred to herein as a "storage system." This storage system in the present embodiment is shared by the host devices 102, and is therefore also referred to herein as a "shared storage system." In embodiments where there is only a single host device 102, the host device 102 may be configured to have exclusive use of the storage system.

The host devices 102 illustratively comprise respective computers, servers or other types of processing devices capable of communicating with the storage arrays 106 via the network 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102.

The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The storage devices 108 of the storage array 106-1 may implement logical units (LUNs) configured to store objects for users associated with the host devices 102. These objects can comprise files, blocks or other types of objects. The host devices 102 interact with the storage array 106-1 utilizing read and write commands as well as other types of commands that are transmitted over the network 104. Such commands in some embodiments more particularly comprise Small Computer System Interface (SCSI) commands, although other types of commands can be used in other embodiments. A given IO operation as that term is broadly used herein illustratively comprises one or more such commands. References herein to terms such as "input-output" and "TO" should be understood to refer to input and/or output. Thus, an TO operation relates to at least one of input and output.

Also, the term "storage device" as used herein is intended to be broadly construed, so as to encompass, for example, a logical storage device such as a LUN or other logical storage volume. A logical storage device can be defined in the storage array 106-1 to include different portions of one or more physical storage devices. Storage devices 108 may therefore be viewed as comprising respective LUNs or other logical storage volumes.

The host devices 102 and storage arrays 106 in the FIG. 1 embodiment are assumed to be implemented using at least one processing platform, with each processing platform comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102 and the storage arrays 106 may be implemented on respective distinct processing platforms, although numerous other arrangements are possible. For example, in some embodiments at least portions of the host devices 102 and the storage arrays 106 are implemented on the same processing platform. One or more of the storage arrays 106 can therefore be implemented at least in part within at least one processing platform that implements at least a subset of the host devices 102.

The network 104 may be implemented using multiple networks of different types to interconnect storage system components. For example, the network 104 may comprise a SAN that is a portion of a global computer network such as the Internet, although other types of networks can be part of the SAN, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Although in some embodiments certain commands used by the host devices 102 to communicate with the storage arrays 106 illustratively comprise SCSI commands, other types of commands and command formats can be used in other embodiments. For example, some embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

The storage array 106-1 in the present embodiment is assumed to comprise a persistent memory that is implemented using a flash memory or other type of non-volatile memory of the storage array 106-1. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory is further assumed to be separate from the storage devices 108 of the storage array 106-1, although in other embodiments the persistent memory may be implemented as a designated portion or portions of one or more of the storage devices 108. For example, in some embodiments the storage devices 108 may comprise flash-based storage devices, as in embodiments involving all-flash storage arrays, or may be implemented in whole or in part using other types of non-volatile memory.

The storage array 106-1 in the present embodiment may comprise additional components not explicitly shown in the figure, such as a response time control module and IO operation priority queues, illustratively configured to make use of the above-described persistent memory. For example, the response time control module may be used to implement storage array-based adjustments in response time for particular IO operations based at least in part on service level objective (SLO) information stored by the storage array 106-1 in its persistent memory. The response time control module is assumed to operate in conjunction with the above-noted IO operation priority queues.

The storage array 106-1 illustratively utilizes its IO operation priority queues to provide different levels of performance for IO operations. For example, the IO operation priority queues may have respective different priority levels. The storage array 106-1 may be configured to provide different priority levels for different ones of the IO operations by assigning different ones of the IO operations to different ones of the IO operation priority queues. The IO operation priority queues are illustratively associated with respective SLOs for processing of IO operations in the storage array 106-1.

As mentioned above, communications between the host devices 102 and the storage arrays 106 may utilize PCIe connections or other types of connections implemented over one or more networks. For example, illustrative embodiments can use interfaces such as Internet SCSI (iSCSI), Serial Attached SCSI (SAS) and Serial ATA (SATA). Numerous other interfaces and associated communication protocols can be used in other embodiments.

The storage arrays 106 in some embodiments may be implemented as part of a cloud-based system.

The storage devices 108 of the storage array 106-1 can be implemented using solid state drives (SSDs). Such SSDs are implemented using non-volatile memory (NVM) devices such as flash memory. Other types of NVM devices that can be used to implement at least a portion of the storage devices 108 include non-volatile random access memory (NVRAM), phase-change RAM (PC-RAM) and magnetic RAM (MRAM). These and various combinations of multiple different types of NVM devices or other storage devices may also be used. For example, hard disk drives (HDDs) can be used in combination with or in place of SSDs or other types of NVM devices. Accordingly, numerous other types of electronic or magnetic media can be used in implementing at least a subset of the storage devices 108.

The storage arrays 106 may additionally or alternatively be configured to implement multiple distinct storage tiers of a multi-tier storage system. By way of example, a given multi-tier storage system may comprise a fast tier or performance tier implemented using flash storage devices or other types of SSDs, and a capacity tier implemented using HDDs, possibly with one or more such tiers being server based. A wide variety of other types of storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, SSDs, HDDs, flash drives, hybrid drives or other types of storage products and devices, or portions thereof, and illustratively include logical storage devices such as LUNs.

As another example, the storage arrays 106 may be used to implement one or more storage nodes in a cluster storage system comprising a plurality of storage nodes interconnected by one or more networks.

It should therefore be apparent that the term "storage array" as used herein is intended to be broadly construed, and may encompass multiple distinct instances of a commercially-available storage array.

Other types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

In some embodiments, a storage system comprises first and second storage arrays arranged in an active-active configuration. For example, such an arrangement can be used to ensure that data stored in one of the storage arrays is replicated to the other one of the storage arrays utilizing a synchronous replication process. Such data replication across the multiple storage arrays can be used to facilitate failure recovery in the system 100. One of the storage arrays may therefore operate as a production storage array relative to the other storage array which operates as a backup or recovery storage array.

It is to be appreciated, however, that embodiments disclosed herein are not limited to active-active configurations or any other particular storage system arrangements. Accordingly, illustrative embodiments herein can be configured using a wide variety of other arrangements, including, by way of example, active-passive arrangements, active-active Asymmetric Logical Unit Access (ALUA) arrangements, and other types of ALUA arrangements.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and one or more associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage arrays 106.

Numerous other distributed implementations of the host devices 102 and/or the storage array 106 are possible. Accordingly, the storage arrays 106 can also be implemented in a distributed manner across multiple data centers.

Additional examples of processing platforms utilized to implement portions of the system 100 in illustrative embodiments will be described in more detail below in conjunction with FIGS. 10 and 11.

The storage array 106-1 implements a logical address space querying module 112. Although not explicitly shown in FIG. 1 for clarity of illustration, it is assumed in some embodiments that other ones of the storage arrays 106-2 through 106-M implement respective additional instances of a logical address space querying module, as well as respective sets of storage devices and storage controllers in a manner similar to that described herein with respect to storage array 106-1. Further, although shown in FIG. 1 as being external to the storage controllers 110 of storage array 106-1, in other embodiments the logical address space querying module 112 may be implemented at least partially within one or more of the storage controllers 110. For example, at least one of the storage controllers 110 may be implemented as a virtual storage controller running on an embedded hypervisor of the storage array 106-1. The logical address space querying module 112 may be part of such a virtual storage controller, or may be run separate from the virtual storage controller on such an embedded hypervisor. Various other arrangements are possible, including where at least a portion of the functionality of the logical address space querying module 112 is implemented external to the storage array 106-1 (e.g., on one or more of the host devices 102, on a separate server, on a cloud computing infrastructure, etc.).

The logical address space querying module 112 is configured to receive queries for finding storage objects of the storage array 106-1 (e.g., more generally, storage objects of a storage system, which may include a storage cluster including the storage array 106-1 and one or more other ones of the storage arrays 106-2 through 106-M) that are associated with a particular snapshot family or snapshot group, and which point to a particular logical page in a logical address space of the storage array 106-1. To do so, the logical address space querying module 112 builds or otherwise generates a tree structure that characterizes relationships between a plurality of storage objects in the storage array 106-1. The tree structure is assumed to comprise a plurality of logical page nodes representing the plurality of storage objects. Each of the plurality of logical page nodes specifies a logical page address in the logical address space of the storage array 106-1, and includes various metadata such as an array of pointers to one or more other logical page addresses in the logical address space, a snapshot group identifier for a snapshot group in the storage array 106-1, and a logical extent offset in the logical address space. The generated tree structure may be viewed as a two-level data structure, where the first level corresponds to snapshot group identifiers and the second level is a hash of binary trees associated with respective ones of the snapshot group identifiers.

The logical address space querying module 112 is further configured to receive queries (e.g., from the host devices 102, from a file system check tool scanning the storage array 106-1, etc.), where a given query comprises a given logical page address, a given snapshot group identifier, and a given logical extent offset. The given query may be viewed as a request to find whether a given snapshot group associated with the given snapshot group identifier has a given logical page node (e.g., representing a given storage object) at the given logical extent offset and, if so, a request to find other logical page nodes (e.g., representing other storage objects) with the given snapshot group identifier and the given logical extent offset that comprise a pointer to the given logical page address in their associated arrays of pointers. The logical address space querying module 112 traverses the generated tree structure to do so, and returns a response to the query that specifies the given logical page and the identified other ones of the plurality of logical pages. In this way, the logical address space querying module 112 is able to find all storage objects within a snapshot group or family that point to the given logical page address.

At least portions of the functionality of the logical address space querying module 112 may be implemented at least in part in the form of software that is stored in memory and executed by a processor.

It is to be understood that the particular set of elements shown in FIG. 1 for finding storage objects of a snapshot group that point to a particular logical page in a logical address space is presented by way of illustrative example only, and in other embodiments additional or alternative elements may be used. Thus, another embodiment may include additional or alternative systems, devices and other network entities, as well as different arrangements of modules and other components.

It is to be appreciated that these and other features of illustrative embodiments are presented by way of example only, and should not be construed as limiting in any way.

Figure 2:
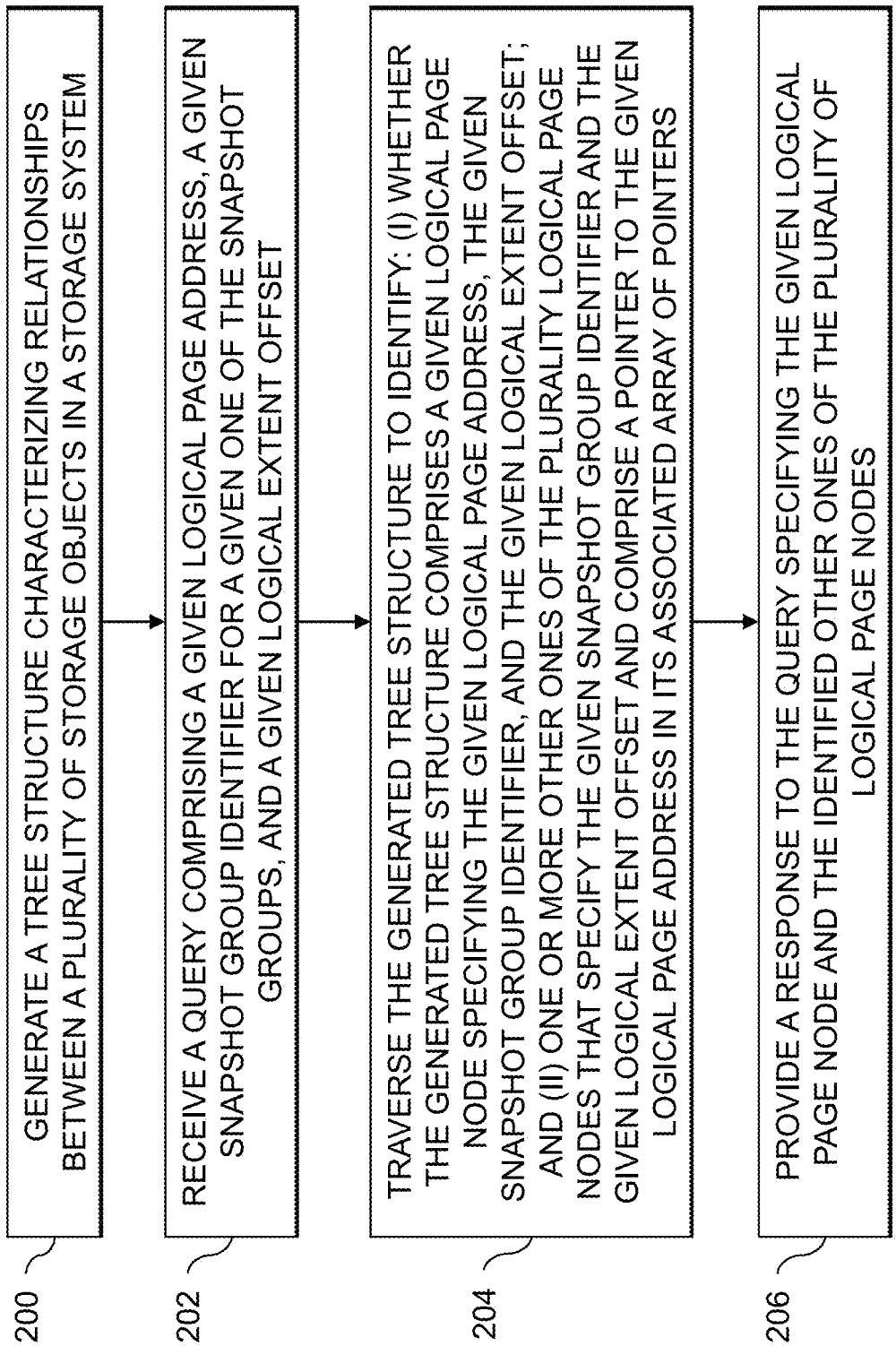
FIG. 2 is a flow diagram of an exemplary process for finding storage objects of a snapshot group that point to a particular logical page in a logical address space of a storage system in an illustrative embodiment.

An exemplary process for finding storage objects of a snapshot group that point to a particular logical page in a logical address space in a storage system will now be described in more detail with reference to the flow diagram of FIG. 2. It is to be understood that this particular process is only an example, and that additional or alternative processes for finding storage objects of a snapshot group that point to a particular logical page in a logical address space in a storage system may be used in other embodiments.

In this embodiment, the process includes steps 200 through 206. These steps are assumed to be performed by the storage array 106-1 utilizing the logical address space querying module 112. The process begins with step 200, generating a tree structure characterizing relationships between a plurality of storage objects in a storage system. The tree structure comprises a plurality of logical page nodes representing the plurality of storage objects. The plurality of logical page nodes specify respective logical page addresses in a logical address space of the storage system, arrays of pointers to one or more other logical page addresses in the logical address space, snapshot group identifiers for snapshot groups in the storage system, and logical extent offsets in the logical address space.

In some embodiments, the logical address space is organized as a B-tree (an example of which will be described in further detail below with respect to FIGS. 4A and 4B), where the B-tree includes multiple levels including a leaf logical page level and one or more additional logical page levels above the leaf logical page level (e.g., a middle page level comprising middle pages associated with respective subsets of leaf pages in the leaf page level, a top page level comprising top pages associated with respective subsets of the middle page in the middle page level, etc.). The generated tree structure may comprise a hash of binary trees that arrange the plurality of logical page nodes into the leaf logical page level and the one or more additional logical page levels above the leaf logical page level. A given one of the top pages may represent an n*m sized portion of the logical address space that references n middle pages in the middle page level each representing an m sized portion of the logical address space, a given one of the middle pages referencing n leaf pages in the leaf page level each representing an m/n sized portion of the logical address space. In some embodiments, n is 512 and m is one gigabyte (GB).

In step 202, a query is received that comprises a given logical page address, a given snapshot group identifier for a given one of the snapshot groups, and a given logical extent offset. Step 202 may include generating the query in response to identifying the given logical page address as being one of corrupted and orphaned during a file system check of the storage system. The tree structure generated in step 200 is then traversed in step 204 to identify: (i) whether the generated tree structure comprises a given logical page node specifying the given logical page address, the given snapshot group identifier, and the given logical extent offset; and (ii) one or more other ones of the plurality logical page nodes that specify the given snapshot group identifier and the given logical extent offset and comprise a pointer to the given logical page address in its associated array of pointers. A response to the query specifying the given logical page node and the identified other ones of the plurality of logical page nodes is provided in step 206.

Step 204, in some embodiments, includes iterating over storage objects corresponding to a given logical storage volume starting with one of the plurality of logical page nodes corresponding to a top page in the top page level for the given logical storage volume. Step 204 may further comprise iterating over storage objects corresponding to one or more snapshots of the given logical storage volume starting with ones of the plurality of logical page nodes corresponding to top pages in the top page level for snapshot volumes of the given logical storage volume.

In some embodiments, the plurality of logical page nodes further specify namespace addresses associated with respective storage objects in the storage system. In such embodiments, step 204 may include iterating over the plurality of logical page nodes vertically starting with the identified ones of the plurality of logical page nodes specifying namespace addresses corresponding to storage objects in the given snapshot group. The identified ones of the plurality of logical page nodes specifying namespace addresses corresponding to storage objects in the given snapshot group may comprise a first one of the plurality of logical page nodes corresponding to a logical storage volume in the given snapshot group and at least a second one of the plurality of logical page nodes corresponding to at least one snapshot of the logical storage volume in the given snapshot group.

The given logical page address in the query 202 may correspond to a corrupted logical page in the logical address space, and the response to the query provided in step 206 may provide a corrupted range bitmap in the logical address space. When the given logical page address in the query 202 corresponds to a corrupted logical page in the logical address space, and where the given logical page node is in a given level of the generated tree structure (e.g., a middle or mid page level), the FIG. 2 process may further include fixing the corrupted logical page utilizing one or more logical page nodes in the given subset of the plurality of logical page nodes having horizontal relationships to the given logical page node in the given level of the generated tree structure.

Figure 3:
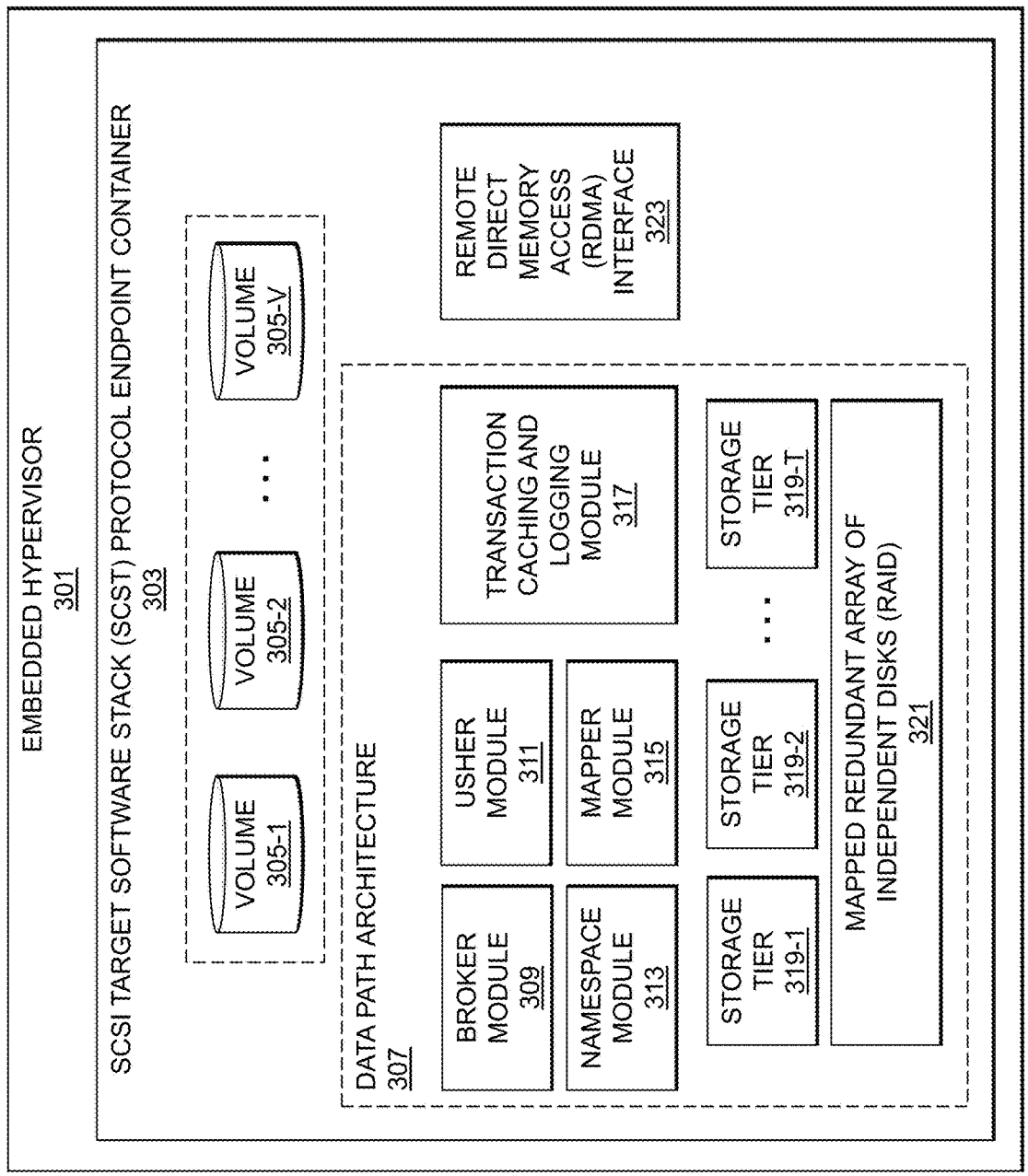
FIG. 3 is a block diagram of an embedded hypervisor implementing a data path architecture in an illustrative embodiment.

FIG. 3 shows a view of a data path architecture 307 for an I/O stack of a storage array (e.g., storage array 106-1). The data path architecture 307 is assumed to be implemented on an embedded hypervisor 301 (e.g., a VMware ESXi™ hypervisor) that runs a base container 303 providing an SCSI target software stack (SCST) protocol endpoint. The embedded hypervisor 301 is an example of a "virtual" storage controller of a storage system (e.g., a virtual one of the storage controllers 110 in storage array 106-1). The SCST protocol endpoint container 303 includes a set of volumes 305-1, 305-2, . . . 305-V (collectively, volumes 305) and the data path architecture 307. The data path architecture 307 includes a broker module 309, usher module 311, namespace module 313, mapper module 315, and a transaction caching and logging module 317. The data path architecture 307 also includes a set of storage tiers 319-1, 319-2, . . . 0.319-T (collectively, storage tiers 319) and a mapped redundant array of independent disks (RAID) 321. The transaction caching and logging module 317 is configured to utilize remote direct memory access (RDMA) interface 323 as described in further detail below.

The broker module 309 is configured to facilitate communication amongst the various other modules of the data path architecture 307. In some embodiments, the data path architecture 307 implements a layered services model (e.g., for copy engines, replication, migration, etc.). The usher module 311 is configured to implement I/O request queues, including priority share-based scheduling and Quality of Service (QoS) for I/O requests in such queues. The namespace module 313 is configured to implement active/active "thin" volumes and maintain volume attributes. The namespace module 313 is also configured to implement a key-value (K-V) store and directories. The mapper module 315 is configured to implement a thin mapping layer using log-structured writes, with inline compression, deduplication and pattern matching functionality. The mapper module 315 is also configured to implement functionality for snapshotting and determining snapshot differentials, for performing space accounting, and for file system checking (e.g., using a tool such as a Linux file system consistency check (FSCK) tool). The transaction caching and logging module 317 is configured to implement transactions for the active/active volumes, to perform distributed locking, and to implement read/write-back and write-ahead logs. The transaction caching and logging module 317 may comprise two instances, one for data and one for metadata. The mapped RAID 321 is configured to implement distributed virtual striping (e.g., using 4+1 and 8+1 RAIDS implementations) and to provide thin rebuild and distributed sparing. The mapped RAID 321 may support various native block sizes (e.g., 512 bytes (B), 4096B or 4 kilobytes (KB), etc.).

In some embodiments, the usher module 311 implements a data plane polling model. From the producer side (e.g., of the SCST protocol endpoint), requests are submitted using per-core threads. Polling threads pull new I/O requests to user space. The polling threads may execute when associated data plane threads are idle. Load balancing, affinity and QoS (e.g., share-based scheduling and traffic shaping) features may be provided.

The namespace module 313, as described above, is configured to create and expose thin block volumes, and provides functionality for volume management and attributes as well as space management and accounting. The namespace module 313 enables or provides a namespace layer that utilizes a block interface with file-like semantics. In the namespace layer, volumes (e.g., volumes 305) are bound to block protocol endpoints (e.g., PE LUNs). The mapper module 315 enables or provides a mapping layer, which exposes a single contiguous thin address space to the namespace layer. The namespace layer consumes the logical address space provided by the mapper layer.

The namespace layer may use a format that includes a "super block" created by an internal format and anchored at a logical block address (LBA) of 0. The super block identifies locations of allocations, an inode table, and a "root"

directory. The allocations provide references to extent allocators, used to manage free space, as well as to inodes. The extent allocators may use a binary buddy system, and enable efficient reclaiming and defragmenting functionality. In some embodiments, the minimum allocation size is 8 MB, and the minimum allocation size for virtual volumes (VVols) such as volumes 305 is 2 GB. The volume allocation aligns to the "mid" level of the mapper as described in further detail below.

The inode allocators provide references to an inode table, which in some embodiments is scalable to millions of inodes and is organized as a free list. An inode may include various content, such as an object type (e.g., file, directory), family universally unique identifier (UUID), inode number and generation, link count, unique identifier (UID) owner, global identifier (GID) owner, object extent location, create and other timestamps, parent inode number, parent directory cookie, etc. The root inode references a root directory object that contains a list of file names and inodes, while additional inodes contain volume data (e.g., by allocating a data extent and inode, and adding the volume name and inode to the root directory). Multiple volume data extents may be created. Object handles may be used by the usher module 311 to submit I/O thru handles (e.g., inodes) to avoid unnecessary name lookup.

The transaction caching and logging module 317 may implement a transaction cache and a transaction log. The transaction cache, in some embodiments, is transactional and provides read and write cache buffering with two instances (e.g., data and metadata). The transaction cache pages data and metadata in and out of memory, and provides local and distributed peer-to-peer (P2P) sticky locks. In some embodiments, an active/active configuration, an ALUA configuration, or combination thereof may be used. For example, the data path architecture 307 may be active/active, while SCST supports both active/active and ALUA. The transaction log provides write-ahead transaction logs, such as by using low latency mirrored NVRAMs for persistence. The transaction cache, for example, may be implemented in-memory (e.g., DRAM), while the transaction log is persisted to NVRAM.

The mapper module 315, as noted above, may provide a mapping layer of the data path architecture 307. The mapping layer may provide various functionality, such as enabling patterns, deduplication, compression, and mapping. Pattern functionality includes storing patterns (e.g., rather than pointer+data), and re-generates data on read, and may include 4 KB of 0 s or 1 s (where, in this context, 0s are different than unmapped space). Deduplication functionality includes the use of a fingerprint cache and read and compare validation. Compression functionality may include the use of various types of compression algorithms, including QAT hardware offload, LZ Deflate, Dynamic Huffman, etc. In some embodiments, data is compressed and packed into 2 MB data stripes. The mapping functionality includes a thin map, implemented in some embodiments as a 512-way B-tree structure described in further detail below. The thin map in such embodiments is keyed by LBA (e.g., rather than using content-addressable storage (CAS)), and provides snapshot and differential capability along with copy-by-reference. The mapper module 315 may utilize the storage tiers 319 (e.g., using flash tiers, storage-class memory (SCM) tiers, NVRAM tiers, etc.).

Figure 4B:
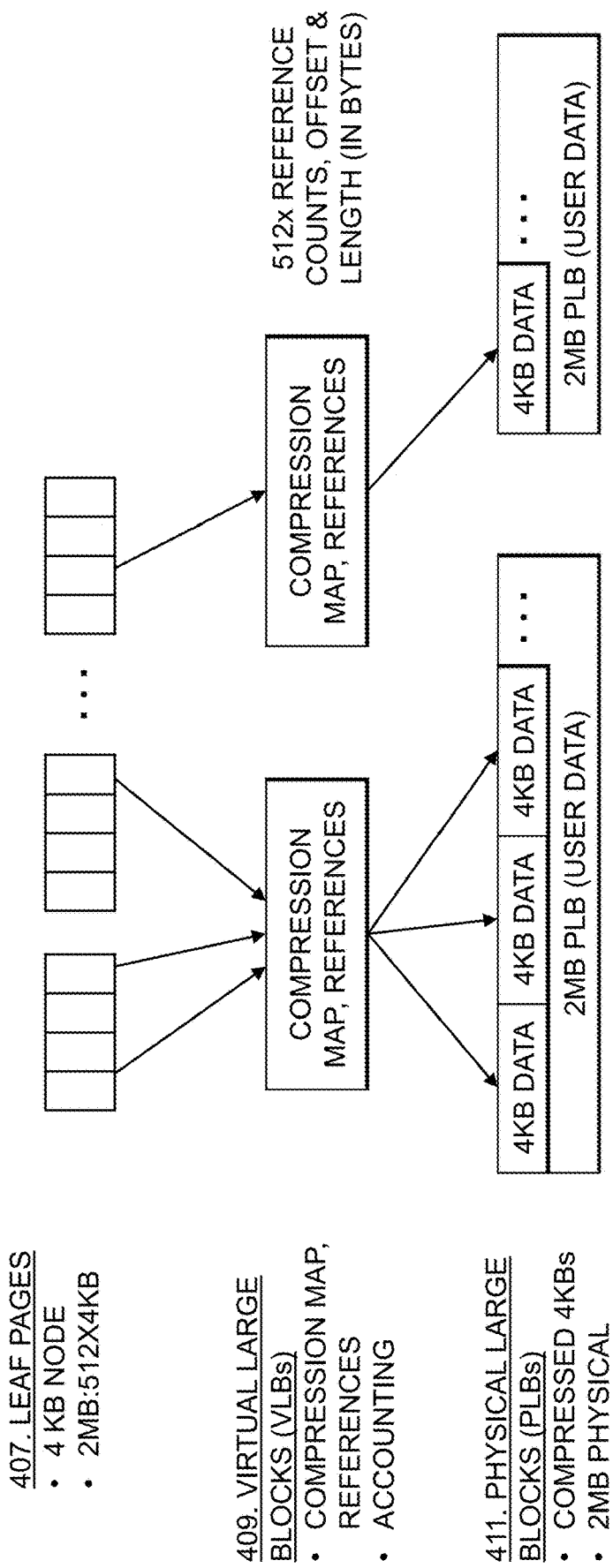

FIGS. 4A and 4B show a tree structure utilized by the mapper module 315 to store data in some embodiments. As noted above, the tree structure may comprise a 512-way B-tree structure, with levels for root pages 401, top pages 403, middle ("mid") pages 405, leaf pages 407, virtual large blocks (VLBs) 409, and physical large blocks (PLBs) 411. As illustrated in FIG. 4A, the root pages 401 provide a logical address space, which in some embodiments ranges from 0 to 8 exabytes (EB). The logical address space, which may be a thin logical address space, includes various inode offsets, two of which are labeled (e.g., inode[0] and inode [1]). Each of the inode offsets for the root pages 401 include a 4 KB node with 512 indirection pointers to respective ones of the top pages 403, each of the top pages 403 also has a 4 KB node with 512 pointers to respective ones of the middle pages 405, and each of the middle pages 405 has a 4 KB node with 512 pointers to respective ones of the leaf pages 407. Each of the leaf pages 407 may represent 2 megabytes (MB), and thus a given one of the middle pages 405 may represent 1 gigabyte (GB) (e.g., 512 of the leaf pages 407×2 MB) and a given one of the top pages 403 may thus represent 512 GB (e.g., 512 of the middle pages 405×1 GB).

As illustrated in FIG. 4B, each of the leaf nodes 407 may include 512 pointers to VLBs 409 each representing 4 KB (e.g., such that a given one of the leaf nodes 407 represents 2 MB as noted above, as 512×4 KB=2 MB). The VLBs 409 include reference counts, compression maps, and accounting information (e.g., offset and length, in bytes (B)) for the PLBs 411. Each of the PLBs 411 provides 2 MB physical space for storing user data (e.g., as a set of 4 KB compressed data blocks).

The mapper module 315 may access the tree structure of FIGS. 4A and 4B using keys, where a key for the root pages 401 level includes a host LBA and inode offset and index, where the index is the key divided by 256 terabytes (TB). At the top pages 403 level, the index is the key modulo 512 GB. At the middle pages 405 level, the index is the key modulo 1 GB. At the leaf pages 407 level, the index is the key modulo 2 MB.

Figure 5A:
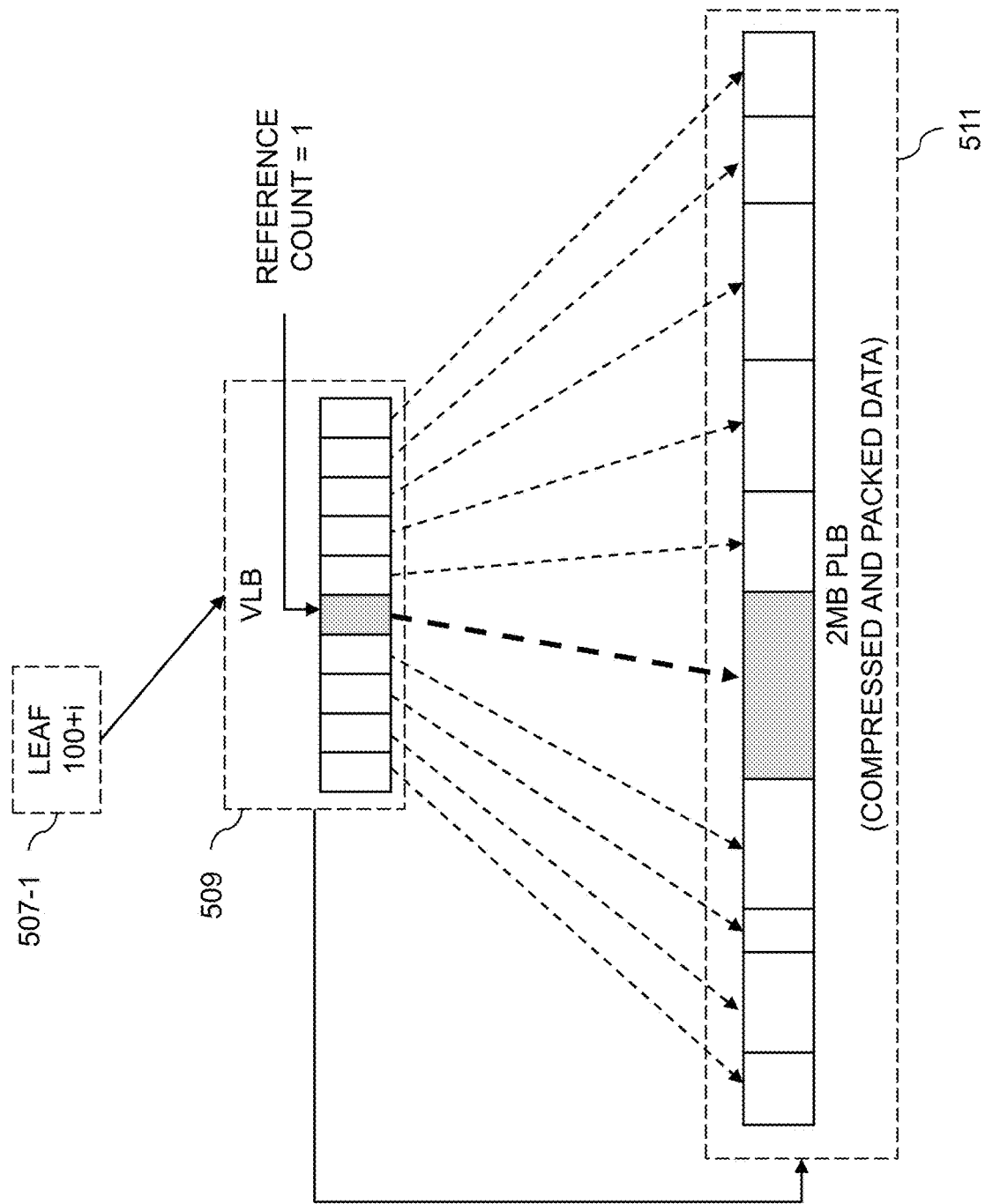
FIGS. 5A and 5B illustrate deduplication using a virtual large block of the tree structure of FIGS. 4A and 4B in an illustrative embodiment.
Figure 5B:
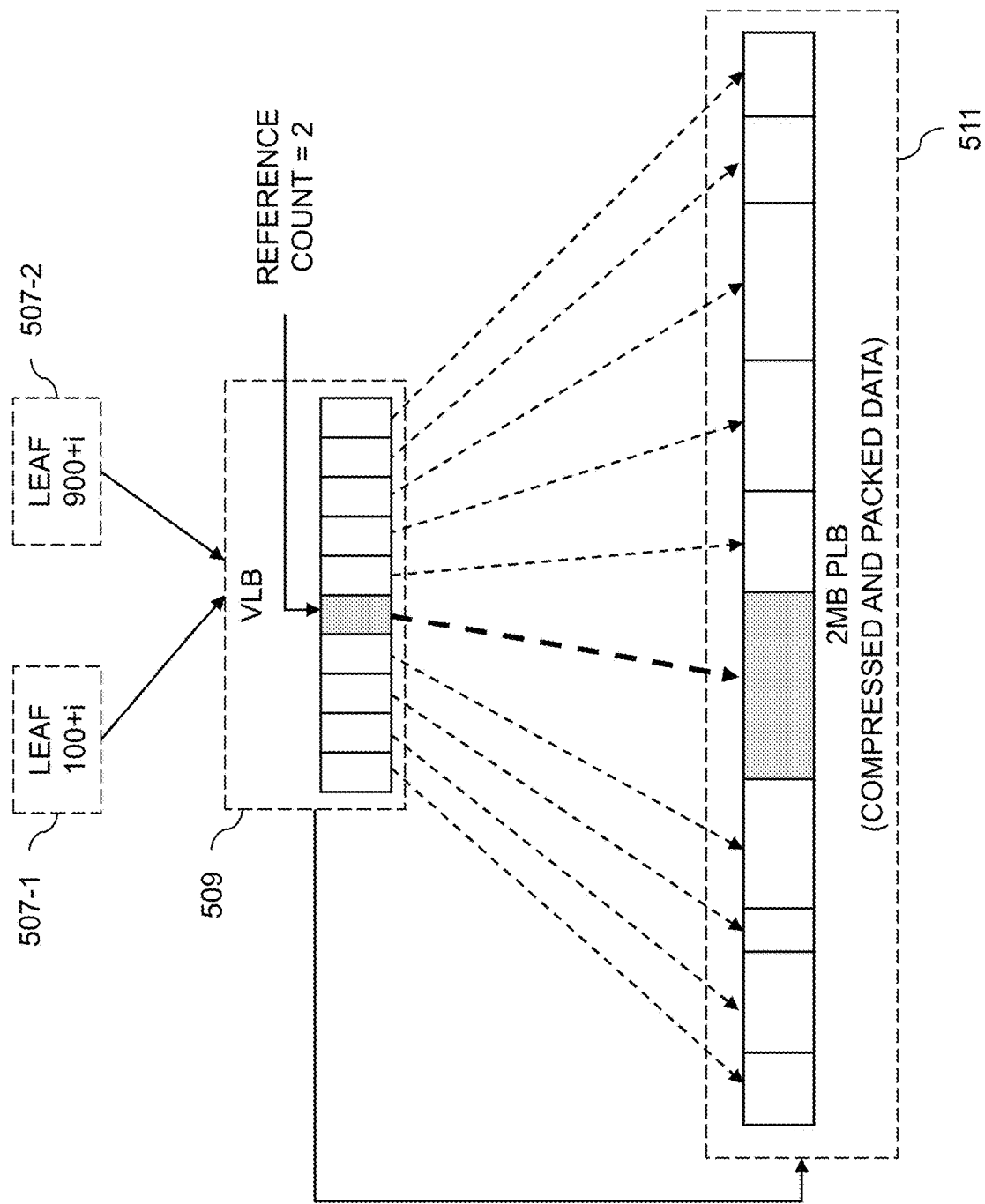

FIGS. 5A and 5B show deduplication using VLBs of the tree structure of FIGS. 4A and 4B. FIGS. 5A and 5B show a given VLB 509 and associated PLB 511 which includes 2 MB of compressed and packed data. The VLB 509 is assumed to contain a block address of the PLB 511, which provides a 2 MB data extent, and an array with 512 virtual entries. The virtual entries of a VLB, such as the 512 entries of VLB 509 in the example of FIGS. 5A and 5B, may be associated with respective virtual block addresses. Each VLB may thus be associated with a VLB extent that comprises a range of virtual block addresses (a VLB extent, in some cases, may include multiple VLBs such that its associated range of virtual block addresses span the multiple VLBs). Such an arrangement will be described in further detail below with respect to FIG. 7.

Each of the 512 virtual entries of the VLB 509 includes a byte offset to where a compressed 4 KB data portion starts in the PLB 511, as well as a byte length of the compressed 4 KB data portion and a reference count (e.g., the number of leaf page references to that compressed 4 KB data portion). In FIG. 5A, one leaf page 507-1 (e.g. leaf 100+i) references a particular compressed 4 KB data portion (e.g., shaded in gray) in the PLB 511. Thus, as shown in FIG. 5A, the reference count in the VLB corresponding to that portion (e.g., also shaded in gray) is 1. FIG. 5B shows that, when another leaf page 507-2 (e.g., leaf 900+i) also references that particular portion in PLB 511, the reference count for that portion in VLB 509 is updated to 2. In this way, two or more leaf pages can reference the same virtual block address. In the example of FIGS. 5A and 5B, deduplication has a granularity of 4 KB (e.g., the size of each compressed data portion in the PLB 511). Some embodiments enable a global deduplication domain, where any of the leaf pages can reference any of the compressed data portions in any of the PLBs. The reference count, however, may limit deduplication to a certain amount (e.g., 256:1).

To implement deduplication, a deduplication "fingerprint" cache may be utilized. The fingerprint cache may be implemented as a large K-V store, with N-way associative hashes providing fast, in-memory lookup that enables verification of deduplication with read and compare. Consider a piece of data, denoted $data_1$, that is found in the fingerprint cache. This may include hashing $data_1$, where the hash matches a key in the K-V store corresponding to a given VLB. The given VLB is then fetched to find the page referenced, and the corresponding portion of the associated PLB is read, decompressed and then compared to verify that $data_1$ is a duplicate. Consider another piece of data, denoted $data_2$, that is not found in the fingerprint cache. In this case, a new entry is added to the K-V store (e.g., a new K-V pair). If there is no remaining space, entries may be evicted using any suitable cache replacement algorithm, such as a least recently used (LRU) cache replacement algorithm. The $data_2$ is then stored as a new 4 KB data block in one of the PLBs.

The mapper module 315 may implement log-structured writes for efficient full stripe RAID writes (e.g., where each stripe is 2 MB continuing the example above) to flash memory using mapped RAID 321. Pending writes are flushed from the transaction cache or transaction log cache implemented by transaction and log caching module 317. Patterns and duplications are subtracted, then the data is compressed and packed into a stripe. The full stripe is then written and mapped to the thin address space.

Figure 6A:
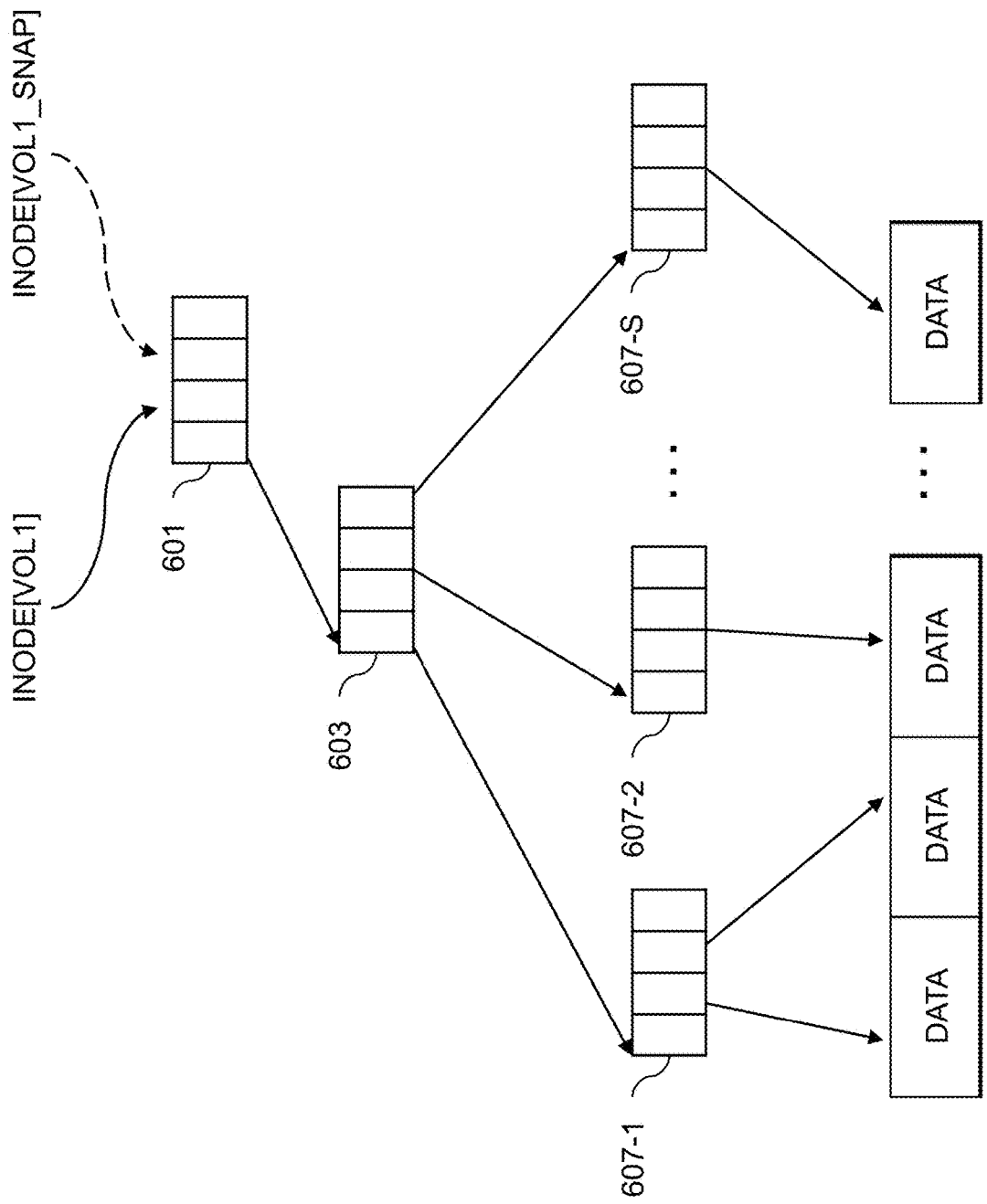
FIGS. 6A-6D illustrate snapshotting using the tree structure of FIGS. 4A and 4B in an illustrative embodiment.
Figure 6B:
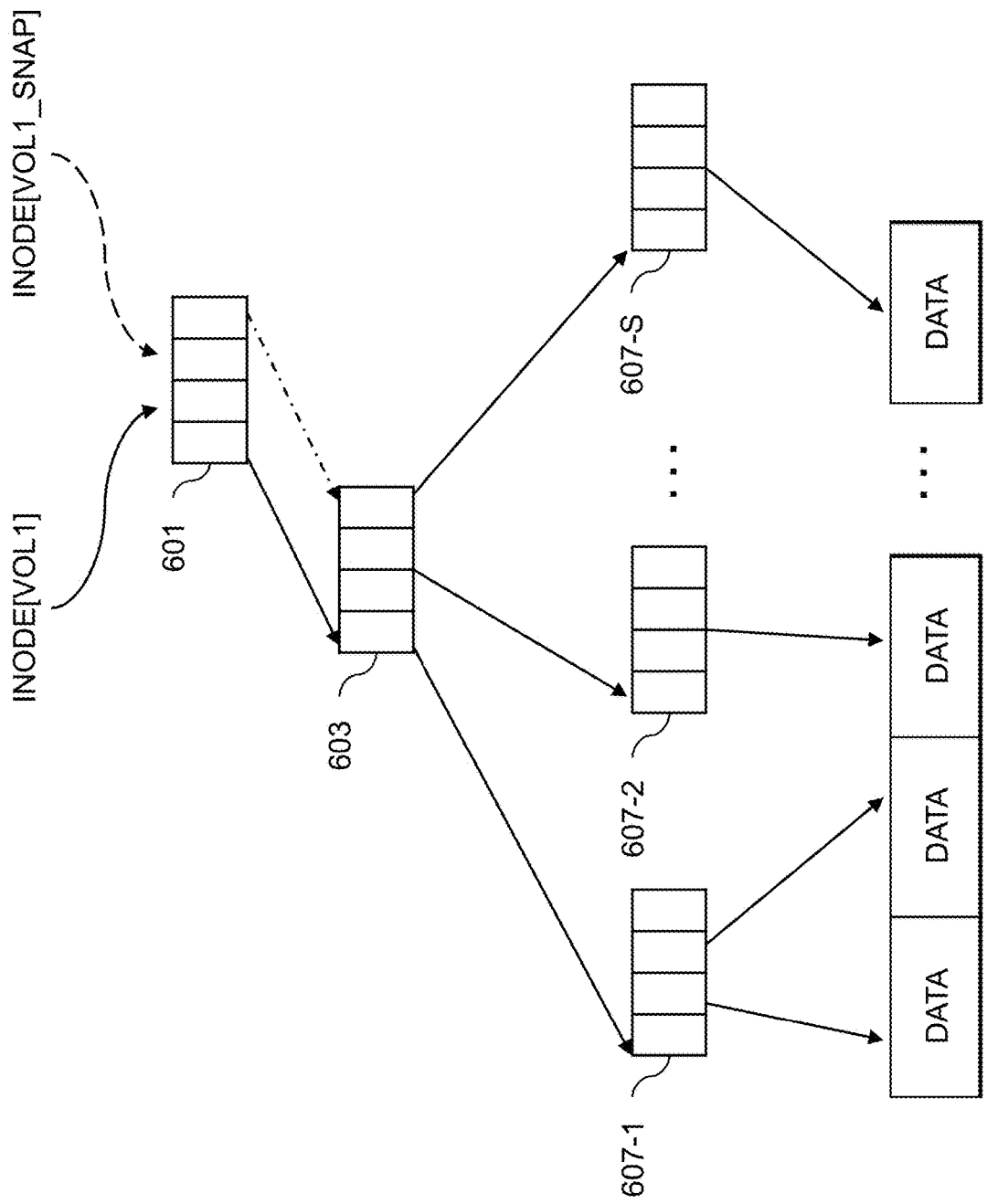
Figure 6C:
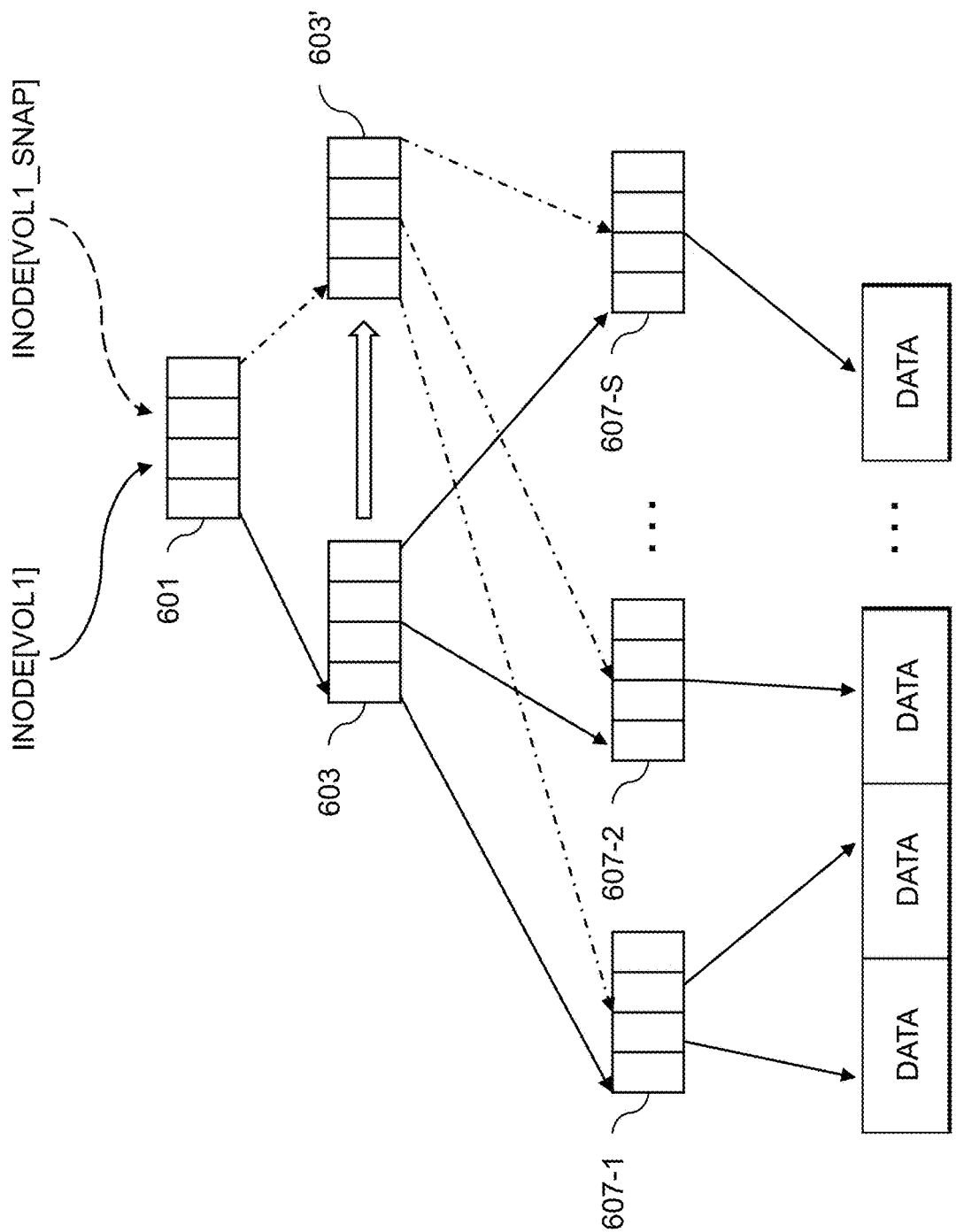
Figure 6D:
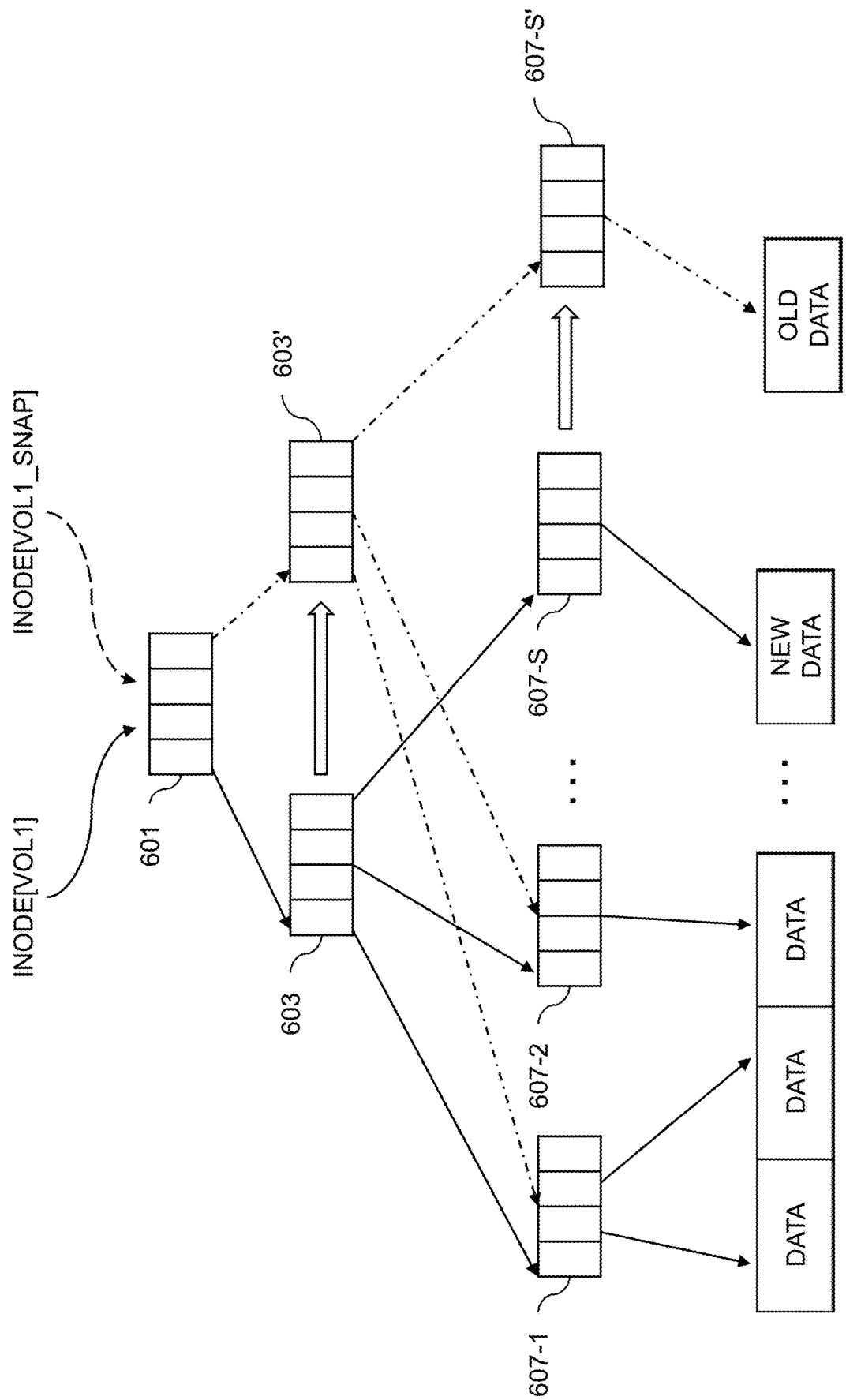

FIGS. 6A-6D illustrate snapshotting functionality enabled by the mapper module 315 using the B-tree structure described above with respect to FIGS. 4A and 4B. As shown in FIG. 6A, a particular inode for a volume (e.g., inode[vol 1]) references a particular root page 601, which reference a top page 603, which references a set of middle pages (not shown), which references a set of leaf pages 607-1, 607-2, . . . 607-S (collectively, leaf pages 607) which reference underlying data (e.g., through VLBs and PLBs not shown). When a snapshot of the volume is created, another inode is allocated (e.g., inode[vol 1_snap]) that references the root page 601 and copy-by-reference is performed as shown in FIG. 6B. On a first write to the volume (e.g., to vol 1), the nodes of the tree structure are split in a recursive manner. First, the top page 603 is copied to top page 603' as shown in FIG. 6C. Middle pages (not shown) are then copied, follow by copying one of the leaf pages 607 affected by the write. As shown in FIG. 6D, this includes copying leaf page 607-5 to leaf page 607-S'. The new data to be written is stored in one or more VLBs and PLBs referenced by leaf page 607-S, while the old or existing data is stored in one or more VLBs and PLBs referenced by leaf page 607-S'.

The mapped RAID 321, as noted above, implements virtual striping (e.g., using 4+1 and 8+1 RAIDS), enabling thin rebuild, distributed sparing, and various native block sizes (e.g., 512B, 4096B, etc.). The RAID geometry may be selected based on the number of SSD disks (e.g., with 6-9 SSDs, 4+1 RAID may be used, with 10+ SSDs, 8+1 RAID may be used). It should be noted that embodiments are not limited to using SSD disks in a RAID. In other embodiments, other types of disks or storage devices may be used. The description below, however, assumes the use of SSDs for clarity of illustration. In some cases, the mapped RAID 321 may use resiliency sets, as reliability may drop as more SSDs are grouped together. To constrain the fault domain, resiliency sets may be split once a threshold number of SSDs is reached (e.g., with a 25 SSD maximum, the resiliency set is split on adding a $26^{th}$ SSD).

In some embodiments, the mapped RAID 321 includes a disk layout that has a minimum number of 6 SSD disks (e.g., flash SSDs or 3DXP SSDs). Serial attached SCSI (SAS) expansion may be used to expand the number and size of disks used. In some embodiments, particular slots or disks (e.g., 2 or 4 NVRAM SSDs) may be reserved for use as the transaction log cache implemented by transaction caching and logging module 317. A global configuration database (DB) may be stored using 1 MB on each drive in the mapped RAID 321, which includes a GUID and drive state information. The mapped RAID 321 may include a RAID map DB that is 3-way mirrored across three of the disks, and includes information such as RAID type, width, etc. The mapped RAID 321 also utilizes metadata, data, and possibly other tiers. The mapper module 315 is configured to expand the tiers for more space, where expanding a tier includes forming a RAID geometry by allocating slices, adding to the RAID map, and returning to the mapper layer. A slice of the mapped RAID 321 may include 4 GB RAID allocation extents (NVRAM may use 128 MB), one or more "ubers" that each include N+1 slices grouped into a RAID set (e.g., 1+1, 4+1, 8+1, etc.), and one or more tiers each including a group of ubers.

In summary, the data path architecture 307, on receiving an I/O request from a host to store data, will write the data quickly and persistently to a cache (e.g., the transaction cache implemented by the transaction caching and logging module 317) and then send an acknowledgement to the host. The data path architecture 307 will then utilize the mapper module 315 identify and subtract patterns and duplicates in the data to form a flush set (e.g., a 2 MB flush set). The flush set is then compressed, packed and written to 2 MB stripes (e.g., in the mapped RAID 321).

In a log structured file system, such as that used in the data path architecture 307, mappings (e.g., as provided using the mapping module 315) provide critical information that links the user data to the physical location on the storage devices (e.g., SSDs). With deduplication, multiple logical blocks can point to the same virtual block address of a given VLB. In this case, the VLB includes virtual entries for each virtual block address, with a given virtual entry maintaining a reference count indicating how many logical blocks point to a given virtual block address. When file system checks (e.g., using a tool such as FSCK) are run, the consistency of the map is validated by cross-checking the reference count stored in the virtual entry of the VLB with the number of logical blocks pointing to the virtual block address. In a map with a large number (e.g., millions, billions, etc.) of virtual block addresses with associated virtual entries in the VLBs, the file system check should run as quickly as possible to validate the consistency of the map while reducing downtime. Since the map can be very large, the parsed data in some cases cannot be kept in memory and thus needs to be persisted to disk. As a given logical block may point to disparate virtual block addresses (e.g., in different VLBs), the file system check may need to issue a large number (e.g., millions, billions, etc.) of single-block reads and writes (e.g., to issue random reads to obtain the reference count for a virtual block address and the increment it, which will later be compared for consistency). Significant efficiencies may be achieved by coalescing entries into a buffer, and then writing them out as single large blocks and also reading them as single large blocks.

In some approaches, a tree data structure is utilized, where an element is inserted when the map is processed. For example, the virtual block address and count may be saved as key-value pairs. In order to validate the reference counts, whenever a logical block is processed the virtual block addresses that it maps to need to be incremented to get the overall reference count that can then be compared with what is stored in virtual entries for the virtual block addresses. Since the map may be very large, it may not fit in-memory and thus needs to be persisted to disk. Thus, every time a logical block is processed in this approach a random disk read is needed to get the virtual block entry, and the reference count is then incremented to do a write. On a storage array with billions of logical blocks, this results in a lot of single block random reads and writes which can cause the file system check to run for a long time (e.g., days) causing significant downtime and disruption. As the reads are done one element at a time which issues a significant number of single block reads and writes, traversing the tree data structure is expensive (e.g., consumes significant compute, network and storage resources, runs for a long time such as days thus leading to significant downtime of a storage array, etc.). Using the techniques described herein, however, lots of small reads and writes are replaced with a smaller number of bigger reads and writes. This allows traversal of the tree structure in a more computationally efficient manner during the file system check (e.g., using fewer compute, network and storage resources, taking less time such as hours rather than days thereby improving uptime of a storage array, etc.).

Figure 7:
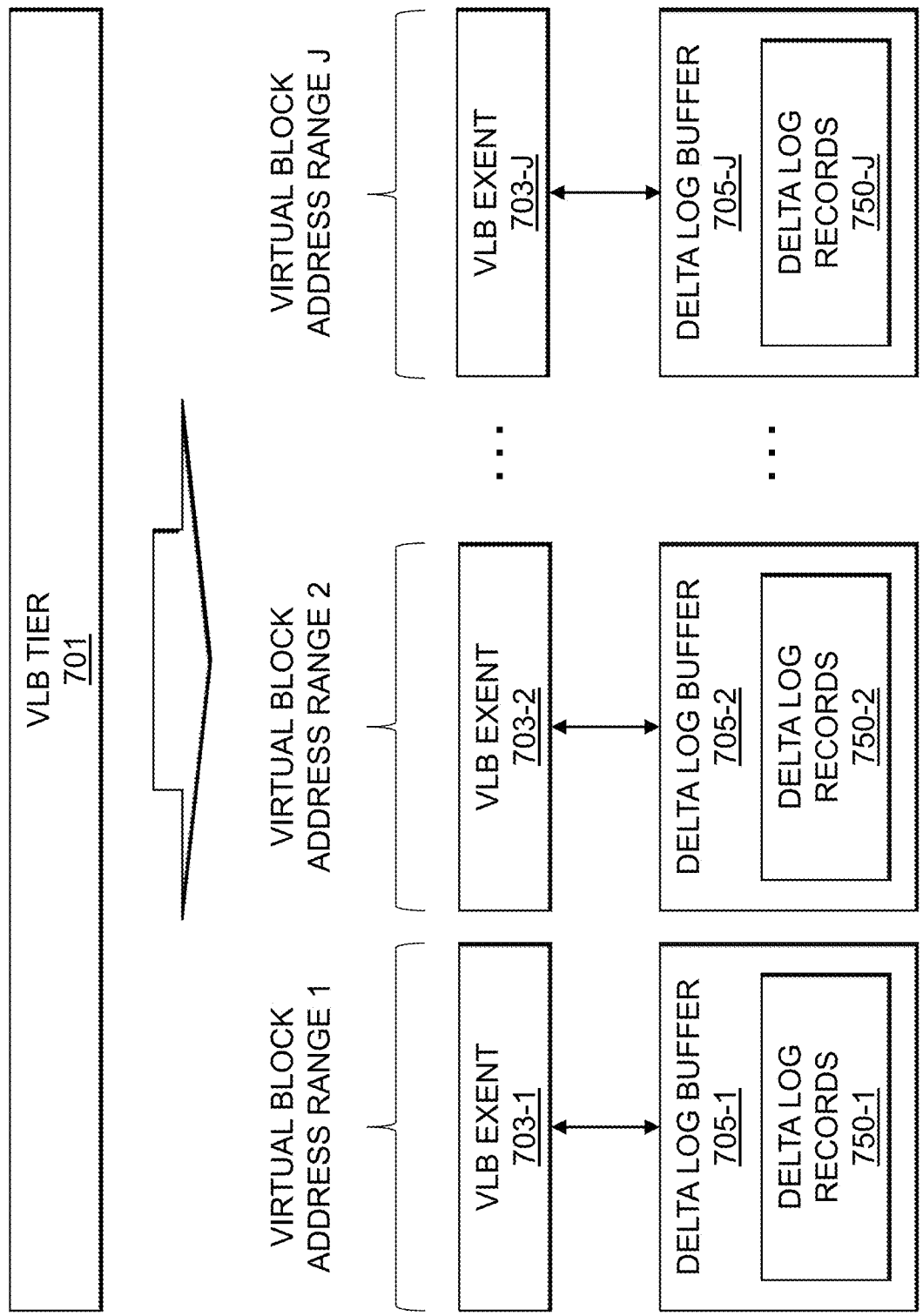
FIG. 7 illustrates a delta log infrastructure for virtual large blocks of a tree structure in an illustrative embodiment.

In some embodiments, the file system check implements "delta" logs for accumulating records into buffers and then persisting such records as a logical tree (e.g., the tree structure of FIGS. 4A and 4B) is traversed. For example, the VLB level (e.g., VLBs 409) of the tree structure shown in FIGS. 4A and 4B may be split into a number of VLB extents representing a range of virtual block addresses. This is illustrated in FIG. 7, which shows a VLB tier 701, where different virtual block address ranges are associated with different VLB extents 703-1, 703-2, . . . 703-J (collectively, VLB extents 703). In some embodiments, each of the VLB extents 703 is associated with one of the VLBs 409 in the tree structure of FIGS. 4A and 4B. In other embodiments, however, a given one of the VLB extents 703 may be associated with multiple ones of the VLBs 409 (e.g., the virtual block address space of the given VLB extent may include virtual block addresses that are in two or more of the VLBs 409). Each of the VLB extents 703-1, 703-2, . . . 703-J is associated with a delta log buffer 705-1, 705-2, . . . 705-J (collectively, delta log buffers 705) that stores delta log records 750-1, 750-2, . . . 750-J (collectively, delta log records 750) for its associated one of the VLB extents 703. In some embodiments, each of the delta log buffers 705 is 2 MB in size, an accumulates delta log records as the logical tree is traversed by the file system check.

When the file system check browses the logical tree and scans leaf pages 407, pointers to virtual entries of the VLBs 409 are encountered. Each such pointer is handed to the delta logging infrastructure and stored as one of the delta log records 750. Based on the virtual block address of pointed to by the leaf page 407 being scanned, an appropriate one of the VLB extents 703 is determined and a delta log entry or record (e.g., including an identifier for a virtual entry for the virtual block address and other information, such as the logical page address of the leaf page that points to the virtual block address as described in further detail below) is put into the appropriate one of the delta logging buffers 705. A presence of a delta log record for a virtual block address or virtual entry indicates a reference count of one. If there are ten delta log records for a particular virtual block address, the reference count is ten. When a given one of the delta log buffers 705 is full, the delta log records 750 stored therein are written out to an associated disk (e.g., the associated one of the VLB extents 703). Once all the leaf pages 407 are traversed, all of the pointers to the virtual block addresses are accumulated in the appropriate VLB extents 703.

After traversing the logical tree structure, the delta logging moves to a consolidation phase where each of the VLB extents 703 is read in intervals (e.g., 2 MB at a time) and, for each delta log associated with a given virtual block address, the reference count for the given virtual block address is incremented. Since one VLB extent is processed at a time, the reference counts may be consolidated in-memory. The VLBs 409 in the logical tree structure of FIGS. 4A and 4B are then read in a batch, and the reference counts in the virtual entries thereof are compared with the corresponding in-memory value (e.g., for a given virtual entry of one of the VLBs 409 corresponding to a given virtual block address, the reference count of the given virtual entry is compared with an "expected" reference count that is in-memory). Appropriate action is taken if inconsistencies are found. Using the delta logging approach, single block random reads and writes may be replaced with sequential large reads and writes significantly improving the file system check run time. It should be noted that, in some embodiments, the VLBs 409 from on-disk may be read prior to reading the delta log buffers 705 and consolidating the delta log records 750 in-memory for each of the VLB extents 705 in-memory.

As described above, some file systems support deduplication features. In cases where multiple storage objects point to the same copy of a piece of data, the logical pages of such storage objects point to the same virtual block address. A given virtual entry for a given virtual block address keeps a reference count to track the number of logical pages that point to the given virtual block address. During recovery of such file systems, it is difficult to keep track of each of the references for each of the virtual block addresses in-memory, or to store such information on a disk and read/write it back as many times as logical pages refer to the virtual block addresses. Thus, as described above, delta logging approaches may be used. In some embodiments, logical page addresses (e.g., addresses of the leaf pages 407) are stored in the delta log records for facilitating creation of a map of corrupted virtual entries back to the logical space (e.g., leaf pages 407, mid pages 405, etc., of a logical tree structure such as that illustrated in FIGS. 4A and 4B).

During logical space browsing conducted as part of a file system check (e.g., using FSCK or another suitable tool), delta log records are submitted to a delta log infrastructure (e.g., to delta log buffers 705 which, when full, may be flushed or persisted to disk) as the leaf pages 407 are traversed. To facilitate mapping of corrupted virtual entries (e.g., cases where an expected reference count determined by consolidating delta logs does not match the actual reference count in virtual entries of the VLBs 409), the leaf page addresses that point to the virtual entries (e.g., in the VLBs 409) may be stored in the delta log records. Thus, once all the logical space is browsed, the delta log infrastructure has all the delta log records for each of the logical references to each of the virtual block addresses, as well as the address of the logical pages that are the source of each of the logical references.

During a consolidation phase of the file system check (e.g., VLB consolidation), each of the delta log records is read from the delta log infrastructure (e.g., from the delta log buffers 705, from the VLB extents 703 on disk) and a consolidated version of the virtual entry (e.g., a VLB entry) is created in-memory. This consolidated version of the virtual entry is also referred to herein as an "expected virtual entry" or "expected VLB entry." The expected virtual entry is then compared with the "actual" virtual entry (e.g., the actual VLB entry) that is stored in the logical tree structure on disk. When a mismatch is detected in the reference count for a given virtual entry (e.g., where the expected and actual virtual entries have different reference counts) this indicates that the given virtual entry may be corrupted. The file system check may then re-read the delta log records to create a map of the leaf pages that point to the corrupted virtual entries.

Once the map of the corrupted virtual entries (e.g., in VLBs 409) and associated leaf pages 407 is created, the file system check uses the map to iterate through the corrupted virtual entries to read each of the leaf pages 407 pointing to each of the corrupted virtual entries. Pointers in such leaf pages 407 to the corrupted virtual entries are modified, such as to a designated value indicating an "uncorrectable bit" that marks that logical space as corrupted. The file system check may also utilize various interfaces to find all the logical paths that point to the corrupted leaf pages 407, and to find the respective logical extents that point to the corrupted virtual entries. In some embodiments, this includes tracing all logical paths up to the mid pages 405 level in the tree structure shown in FIGS. 4A and 4B (e.g., to find all 1 GB logical extents that point to corrupted VLB entries). Thus, as a result, the file system check is able to generate a corrupted range bitmap with each set bit representing a corruption within a 1 GB range that the bit represents. Generation of the corrupted range bitmap will be described in further detail below in conjunction with FIG. 9.

Figure 8A:
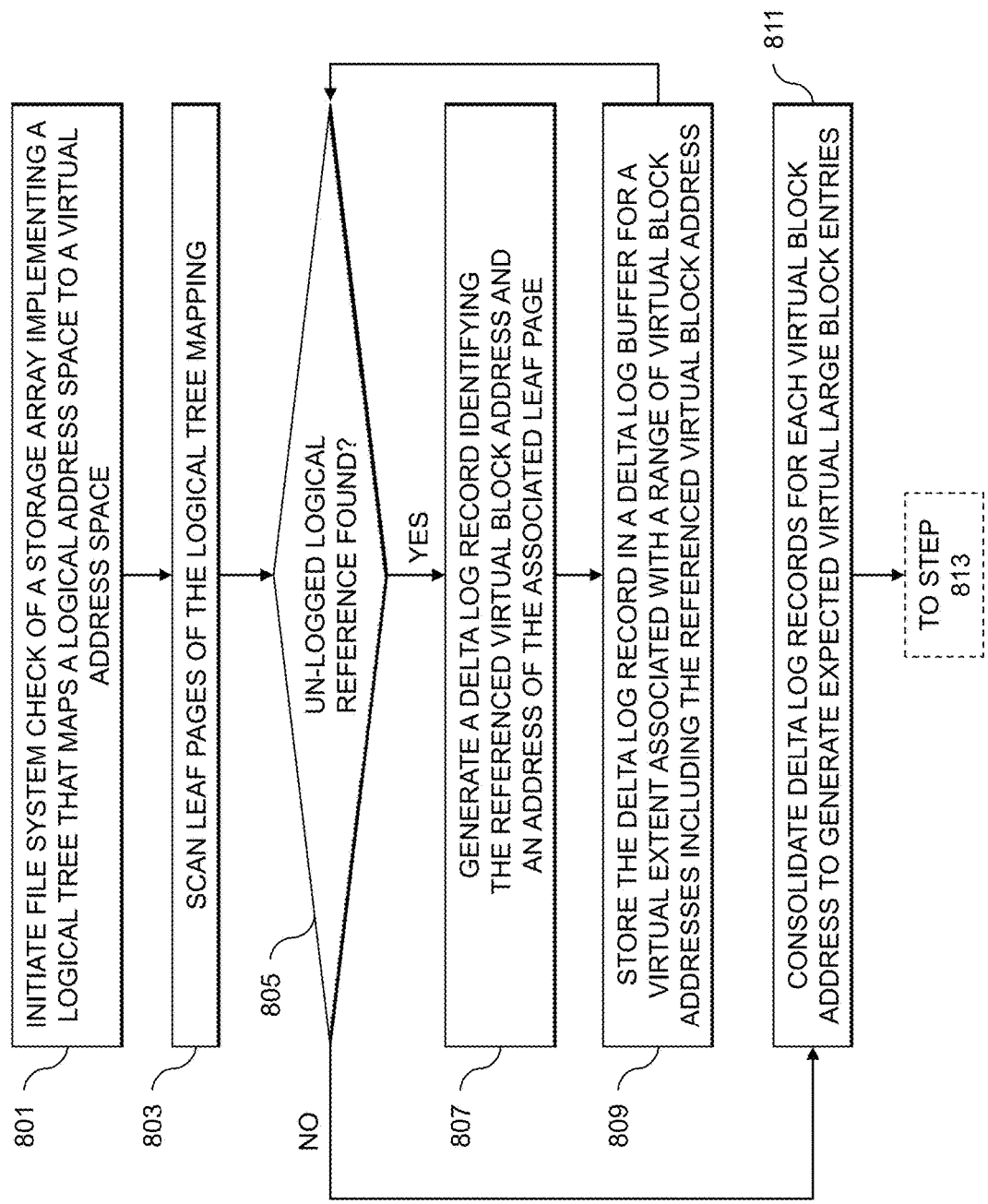
FIGS. 8A and 8B show a flow diagram of an exemplary process for delta logging in an illustrative embodiment.
Figure 8B:
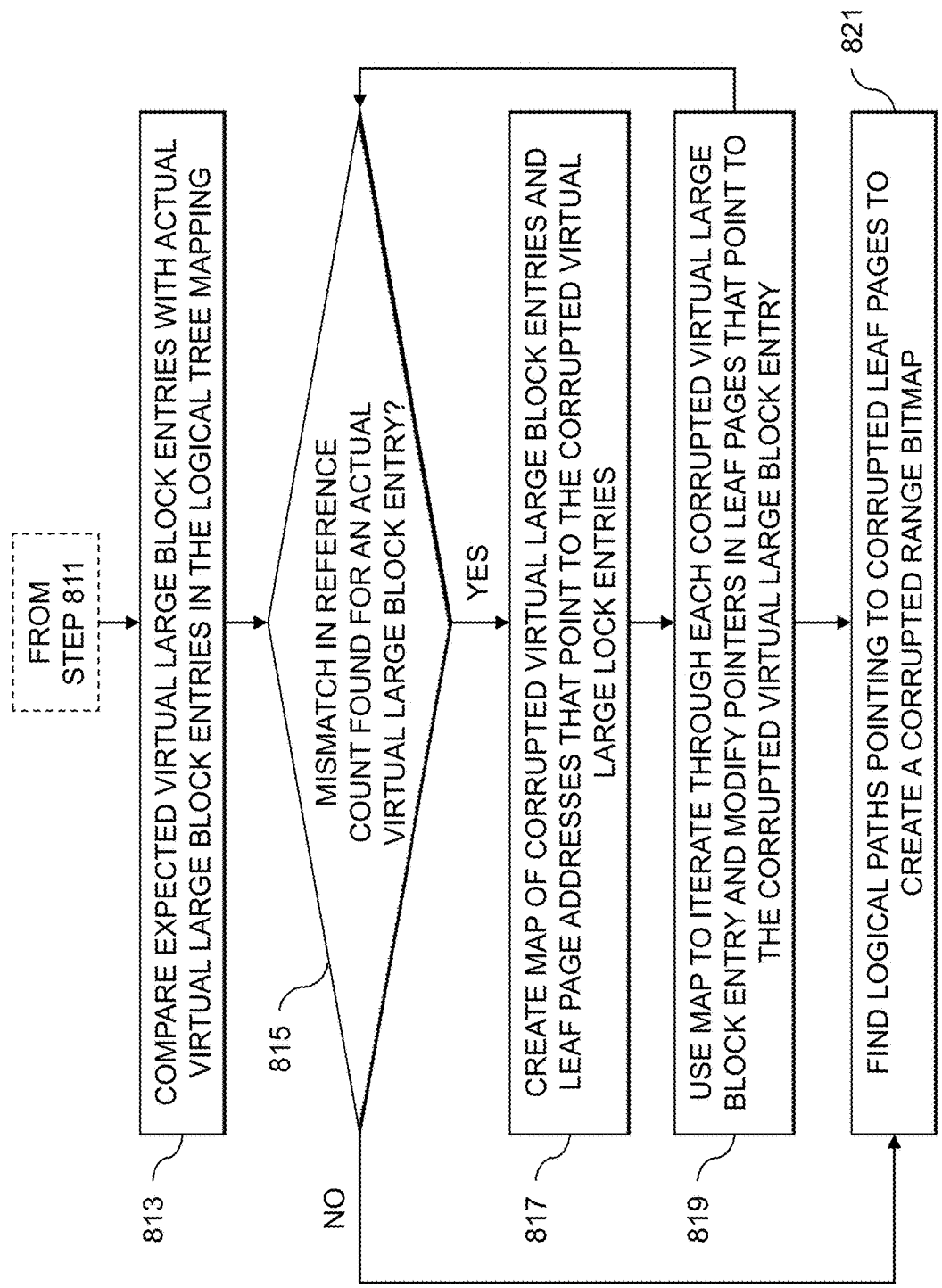

FIGS. 8A and 8B illustrate a process flow for implementing the delta logging approach described above. As shown in FIG. 8A, a file system check (e.g., using FSCK) of a storage array (e.g., storage array 106-1) is initiated in step 801. It is assumed that the storage array being checked includes a data path architecture 307 as described above including a logical address space that uses a logical tree mapping (e.g., as maintained by the mapper layer of the data path architecture 307 implemented using mapper module 315) for mapping the logical address space to a physical address space. The logical address space may be represented by the root pages 401, top pages 403, mid pages 405 and leaf pages 407 in the tree structure shown in FIGS. 4A and 4B, with the leaf pages 407 including pointers to different virtual entries in the VLBs 409 that map to particular physical block addresses in the PLBs 411 as illustrated in FIGS. 4A and 4B.

In step 803, the logical tree mapping is traversed by the file system check to scan leaf pages 407 thereof. In step 805, a determination is made as to whether the leaf page being scanned has any un-logged logical references (e.g., any pointers to VLBs 409 that have not already been captured by generation and storage of a delta log record in previous instances of steps 807 and 809). If the result of the step 805 determination is yes, processing proceeds to step 807 where a delta log record is generated. The delta log record generated in step 805 identifies the referenced virtual entry (e.g., for a virtual block address in one of the VLBs 409) as well as an address of the associated one of the leaf pages 407 that points to that virtual entry. In step 809, the delta log record is stored in one of the delta log buffers 705 for one of the virtual extents 703 associated with a range of virtual block addresses including the virtual block address associated with the referenced virtual entry. The process flow then returns to the step 805 determination. Steps 805 through 809 are repeated until the result of the step 805 determination is no (e.g., until all logical references in the leaf pages 407 scanned during the file system check are logged as delta log records). Once the result of the step 805 determination is no, processing proceeds to step 811, where the delta log records are consolidated for each virtual block address to generate expected VLB entries for each virtual block address.

The process flow then proceeds to step 813 as shown in FIG. 8B. In step 813, the expected VLB entries generated in step 811 are compared with the actual VLB entries in the VLBs 409. In step 815, a determination is made as to whether there is a mismatch in the reference count between any of the actual VLB entries and their corresponding expected VLB entries. If the result of the step 815 determination is yes, the processing proceeds to step 817 where a map of the corrupted VLB entries and the leaf page addresses of leaf pages 407 pointing to the corrupted VLB entries is generated. In step 819, the map is used to iterate through each of the corrupted VLB entries to modify pointers in the leaf pages 407 that reference the corrupted VLB entries. Processing then returns to step 815 to determine if further mismatches in the reference counts between actual and expected VLB entries need to be processed. Once the result of the step 815 determination is no, processing proceeds to step 821 where logical paths pointing to corrupted leaf pages are found to create a corrupted range bitmap.

In the logical address space of the mapper layer provided by mapper module 315 in the data path architecture 307, each logical page may be associated with various metadata, including an indirect data page (IDP) address (e.g., IDP 100, IDP 200, etc.). The IDP is an example of what is more generally referred to as an indirect block address. Each logical page may also include an array of IDP addresses that the logical page points to. The logical page that is associated with a particular IDP address is also referred to as an IDP page.

When performing recovery and other tasks, there may be a need to find the storage objects (e.g., volumes, snapshots, clones, etc.) that point to a particular logical page (e.g., a particular IDP page) in the mapper's logical address page. As described above, for example, it may be desired to find the mappings to a given corrupted IDP page. To do so, two relationships are used: vertical relationships and horizontal relationships. The vertical relationship is navigated by the offset of a given storage object. The horizontal relationship represents a parent-child relationship for a given snapshot family. Information associated with the vertical and horizontal relationships may be stored as a "back pointer" within each IDP page (e.g., top pages 403, mid pages 405 and leaf pages 407 in the logical tree structure of FIGS. 4A and 4B). The relevant information from the back pointer that is used to navigate the vertical and horizontal relationships, in some embodiments, include a namespace address (e.g., from a namespace layer of the data path architecture 307 implemented by namespace module 313), extent offset, and snapshot group identifier (ID).

A two-level data structure may be built-up during the initial browsing of the top IDP pages (e.g., top pages 403) associated with each storage object. This two-level data structure maintains the relationships of the set of storage objects within a given snapshot (snap) group. In some embodiments, the two level-data structure may be viewed as a hash of binary trees, with there being a binary tree for each snap group. The first level of the two-level data structure is navigated based on the snap group IDs to find binary trees in the second level that characterizing the relationships between storage objects for the snapshot groups associated with a selected snap group ID. Given a binary tree for a given snap group ID, it is possible to iterate over the storage objects in the snap group and traverse the vertical relationships using the stored namespace address for the storage object.

A client (e.g., one of host devices 102, the file system check tool such as FSCK, etc.) that wants to search storage objects may provide the desired IDP page address, snap group ID, and extent offset. Given the snap group ID and extent offset from the back pointer of any IDP in the mapper address space, all the storage objects in the given snap group ID may be iterated over to check whether the desired IDP page address is found at the given extent offset. There are various use cases in which such reverse logical lookups are required. For example, such reverse logical lookups may be used to find the vertical and horizontal IDP pages for a given corrupted or orphaned IDP page. Being able to find the vertically and horizontally connected IDP pages provides the ability to potentially fix the corruption related to that IDP page. As another example, such reverse logical lookups may be used to report a corruption that cannot be repaired and results in data loss for all corresponding storage objects that map to the corrupted metadata object (e.g., an IDP page, a VLB object, etc.).

Figure 9:
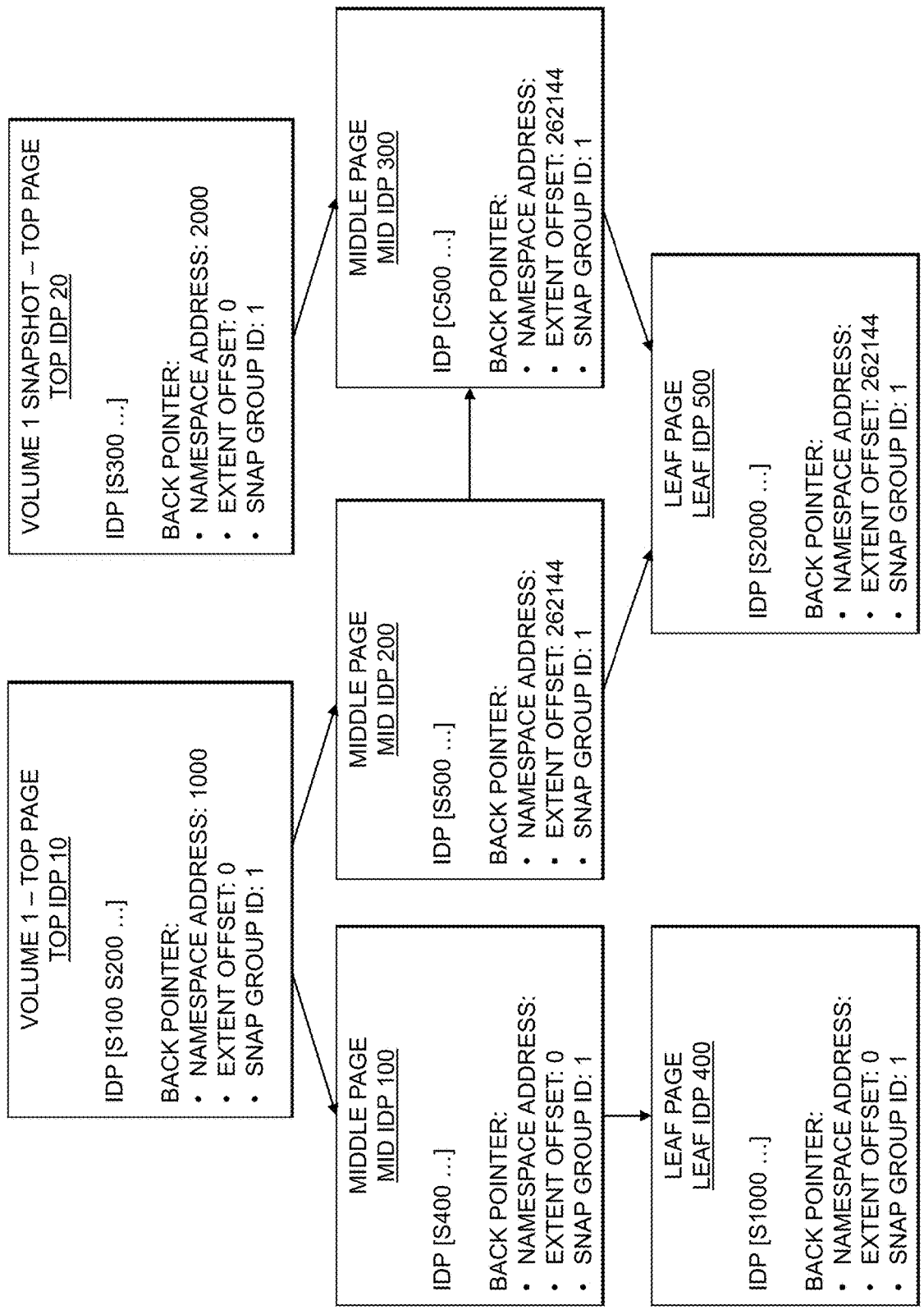
FIG. 9 shows a portion of a logical tree mapping for a reverse logical lookup of a given logical page address in an illustrative embodiment.

Examples of reverse logical lookups will now be described with respect to FIG. 9, which shows a logical tree structure (e.g., selected as described above from a two-level data structure) for a particular snap group ID (e.g., snap group ID=1). More particularly, FIG. 9 illustrates a reverse lookup for reporting corruption at leaf IDP 500. The leaf IDP 500 has an extent offset of 262144 and a snap group ID of 1. The snap group ID of 1 is used to index into the two-level data structure described above to find the binary tree for that given snap group. Once the binary tree is retrieved, then the storage objects can be iterated over to search them vertically for the leaf IDP address of 500. As shown in FIG. 9, the search first traverses through storage objects of volume 1 for the given extent offset, starting with the stored namespace address for the volume 1's starting top IDP page 10. This vertical search goes to the mid IDP 200, in which the matching address of 500 is found for the corrupted leaf IDP. Thus, volume 1 with the corresponding extent offset can be reported as corrupted. Next, the search traverses through the storage objects of a snapshot of volume 1 through top IDP page 20. For the given extent offset, the lookup looks at mid IDP page 300 which has the address 500 for the corrupted leaf IDP.

In FIG. 9, each of the IDP pages (e.g., top IDP pages 10 and 20, mid IDP pages 100, 200 and 300, and leaf IDP pages 400 and 500) includes an array of IDP addresses. For example, top IDP 10 includes IDP addresses of S100, S200, etc. The "S" in such addresses denotes source, while the "C" in addresses for other ones of the IDP pages in FIG. 9 denotes copy (e.g., "C500" in mid IDP page 300). Each of the IDP pages shown in FIG. 9 also includes a back pointer as described above, with a namespace address, extent offset and snap group ID.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for finding storage objects of a snapshot group that point to a particular logical page in a logical address space of a storage system will now be described in greater detail with reference to FIGS. 10 and 11. Although described in the context of system 100, these platforms may also be used to implement at least portions of other information processing systems in other embodiments.

Figure 10:
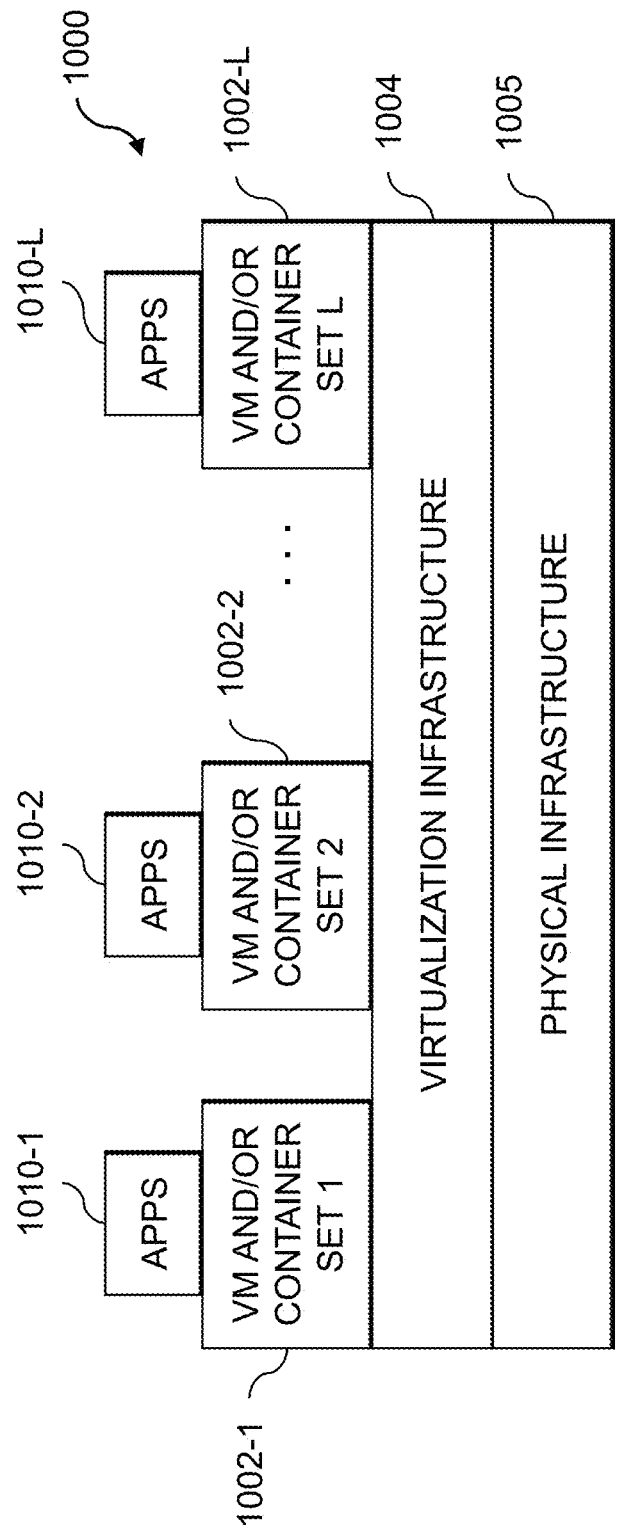

FIG. 10 shows an example processing platform comprising cloud infrastructure 1000. The cloud infrastructure 1000 comprises a combination of physical and virtual processing resources that may be utilized to implement at least a portion of the information processing system 100 in FIG. 1. The cloud infrastructure 1000 comprises multiple virtual machines (VMs) and/or container sets 1002-1, 1002-2, . . . 1002-L implemented using virtualization infrastructure 1004. The virtualization infrastructure 1004 runs on physical infrastructure 1005, and illustratively comprises one or more hypervisors and/or operating system level virtualization infrastructure. The operating system level virtualization infrastructure illustratively comprises kernel control groups of a Linux operating system or other type of operating system.

The cloud infrastructure 1000 further comprises sets of applications 1010-1, 1010-2, . . . 1010-L running on respective ones of the VMs/container sets 102-1, 1002-2, . . . 1002-L under the control of the virtualization infrastructure 1004. The VMs/container sets 1002 may comprise respective VMs, respective sets of one or more containers, or respective sets of one or more containers running in VMs.

In some implementations of the FIG. 10 embodiment, the VMs/container sets 1002 comprise respective VMs implemented using virtualization infrastructure 1004 that comprises at least one hypervisor. A hypervisor platform may be used to implement a hypervisor within the virtualization infrastructure 1004, where the hypervisor platform has an associated virtual infrastructure management system. The underlying physical machines may comprise one or more distributed processing platforms that include one or more storage systems.

In other implementations of the FIG. 10 embodiment, the VMs/container sets 1002 comprise respective containers implemented using virtualization infrastructure 1004 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1000 shown in FIG. 10 may represent at least a portion of one processing platform. Another example of such a processing platform is processing platform 1100 shown in FIG. 11.

The processing platform 1100 in this embodiment comprises a portion of system 100 and includes a plurality of processing devices, denoted 1102-1, 1102-2, 1102-3, . . . 1102-K, which communicate with one another over a network 1104.

The network 1104 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1102-1 in the processing platform 1100 comprises a processor 1110 coupled to a memory 1112.

The processor 1110 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1112 may comprise random access memory (RAM), read-only memory (ROM), flash memory or other types of memory, in any combination. The memory 1112 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1102-1 is network interface circuitry 1114, which is used to interface the processing device with the network 1104 and other system components, and may comprise conventional transceivers.

The other processing devices 1102 of the processing platform 1100 are assumed to be configured in a manner similar to that shown for processing device 1102-1 in the figure.

Again, the particular processing platform 1100 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for finding storage objects of a snapshot group that point to a particular logical page in a logical address space of a storage system as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, storage systems, storage devices, tree structures, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
    at least one processing device comprising a processor coupled to a memory;
    the at least one processing device being configured to perform steps of:
        generating a tree structure characterizing relationships between a plurality of storage objects in a storage system, the tree structure comprising a plurality of logical page nodes representing the plurality of storage objects, the plurality of logical page nodes specifying respective logical page addresses in a logical address space of the storage system, arrays of pointers to one or more other logical page addresses in the logical address space, snapshot group identifiers for snapshot groups in the storage system, and logical extent offsets in the logical address space;
        receiving a query comprising a given logical page address, a given snapshot group identifier for a given one of the snapshot groups, and a given logical extent offset;
        traversing the generated tree structure to identify: (i) whether the generated tree structure comprises a given logical page node specifying the given logical page address, the given snapshot group identifier, and the given logical extent offset; and (ii) one or more other ones of the plurality logical page nodes that specify the given snapshot group identifier and the given logical extent offset and comprise a pointer to the given logical page address in its associated array of pointers; and
        providing a response to the query specifying the given logical page node and the identified other ones of the plurality of logical page nodes.

2. The apparatus of claim 1 wherein the logical address space is organized as a B-tree comprising a leaf logical page level and one or more additional logical page levels above the leaf logical page level.

3. The apparatus of claim 2 wherein the generated tree structure comprises a hash of binary trees arranging the plurality of logical page nodes into the leaf logical page level and the one or more additional logical page levels above the leaf logical page level.

4. The apparatus of claim 3 wherein the one or more additional logical page levels comprise:
    a middle page level comprising middle pages associated with respective subsets of leaf pages in the leaf page level; and
    a top page level comprising top pages associated with respective subsets of the middle page in the middle page level.

5. The apparatus of claim 4 wherein a given one of the top pages represents an n*m sized portion of the logical address space that references n middle pages in the middle page level each representing an m sized portion of the logical address space, a given one of the middle pages referencing n leaf pages in the leaf page level each representing an m/n sized portion of the logical address space.

6. The apparatus of claim 5 wherein n is 512 and m is one gigabyte.

7. The apparatus of claim 4 wherein traversing the generated tree structure comprises iterating over storage objects corresponding to a given logical storage volume starting with one of the plurality of logical page nodes corresponding to a top page in the top page level for the given logical storage volume.

8. The apparatus of claim 4 wherein traversing the generated tree structure further comprises iterating over storage objects corresponding to one or more snapshots of the given logical storage volume starting with ones of the plurality of logical page nodes corresponding to top pages in the top page level for snapshot volumes of the given logical storage volume.

9. The apparatus of claim 1 wherein the plurality of logical page nodes further specify namespace addresses associated with respective storage objects in the storage system.

10. The apparatus of claim 9 wherein traversing the generated tree structure comprises iterating over the plurality of logical page nodes vertically starting with the identified ones of the plurality of logical page nodes specifying namespace addresses corresponding to storage objects in the given snapshot group.

11. The apparatus of claim 10 wherein the identified ones of the plurality of logical page nodes specifying namespace addresses corresponding to storage objects in the given snapshot group comprises a first one of the plurality of logical page nodes corresponding to a logical storage volume in the given snapshot group and at least a second one of the plurality of logical page nodes corresponding to at least one snapshot of the logical storage volume in the given snapshot group.

12. The apparatus of claim 1 wherein receiving the query comprises generating the query in response to identifying the given logical page address as being one of corrupted and orphaned during a file system check of the storage system.

13. The apparatus of claim 1 wherein the given logical page address corresponds to a corrupted logical page in the logical address space, and wherein the response to the query provides a corrupted range bitmap in the logical address space.

14. The apparatus of claim 1 wherein the given logical page address corresponds to a corrupted logical page in the logical address space, wherein the given logical page node is in a given level of the generated tree structure, and wherein the at least one processing device is further configured fix the corrupted logical page utilizing one or more logical page nodes in the given subset of the plurality of logical page nodes having horizontal relationships to the given logical page node in the given level of the generated tree structure.

15. A computer program product comprising a non-transitory processor-readable storage medium having stored therein program code of one or more software programs, wherein the program code when executed by at least one processing device causes the at least one processing device to perform steps of:
generating a tree structure characterizing relationships between a plurality of storage objects in a storage system, the tree structure comprising a plurality of logical page nodes representing the plurality of storage objects, the plurality of logical page nodes specifying respective logical page addresses in a logical address space of the storage system, arrays of pointers to one or more other logical page addresses in the logical address space, snapshot group identifiers for snapshot groups in the storage system, and logical extent offsets in the logical address space;
receiving a query comprising a given logical page address, a given snapshot group identifier for a given one of the snapshot groups, and a given logical extent offset;
traversing the generated tree structure to identify: (i) whether the generated tree structure comprises a given logical page node specifying the given logical page address, the given snapshot group identifier, and the given logical extent offset; and (ii) one or more other ones of the plurality logical page nodes that specify the given snapshot group identifier and the given logical extent offset and comprise a pointer to the given logical page address in its associated array of pointers; and
providing a response to the query specifying the given logical page node and the identified other ones of the plurality of logical page nodes.

16. The computer program product of claim 15 wherein receiving the query comprises generating the query in response to identifying the given logical page address as being one of corrupted and orphaned during a file system check of the storage system.

17. The computer program product of claim 15 wherein the given logical page address corresponds to a corrupted logical page in the logical address space, and wherein the response to the query provides a corrupted range bitmap in the logical address space.

18. A method comprising steps of:
generating a tree structure characterizing relationships between a plurality of storage objects in a storage system, the tree structure comprising a plurality of logical page nodes representing the plurality of storage objects, the plurality of logical page nodes specifying respective logical page addresses in a logical address space of the storage system, arrays of pointers to one or more other logical page addresses in the logical address space, snapshot group identifiers for snapshot groups in the storage system, and logical extent offsets in the logical address space;
receiving a query comprising a given logical page address, a given snapshot group identifier for a given one of the snapshot groups, and a given logical extent offset;
traversing the generated tree structure to identify: (i) whether the generated tree structure comprises a given logical page node specifying the given logical page address, the given snapshot group identifier, and the given logical extent offset; and (ii) one or more other ones of the plurality logical page nodes that specify the given snapshot group identifier and the given logical extent offset and comprise a pointer to the given logical page address in its associated array of pointers; and
providing a response to the query specifying the given logical page node and the identified other ones of the plurality of logical page nodes;
wherein the method is performed by at least one processing device comprising a processor coupled to a memory.

19. The method of claim 18 wherein receiving the query comprises generating the query in response to identifying the given logical page address as being one of corrupted and orphaned during a file system check of the storage system.

20. The method of claim 18 wherein the given logical page address corresponds to a corrupted logical page in the logical address space, and wherein the response to the query provides a corrupted range bitmap in the logical address space.

\* \* \* \* \*